US012562868B2

(12) United States Patent
Choi et al.

(10) Patent No.: US 12,562,868 B2
(45) Date of Patent: Feb. 24, 2026

(54) LOW-LATENCY OPPORTUNISTIC CHANNEL OCCUPANCY TIME SHARING

(71) Applicant: QUALCOMM Incorporated, San Diego, CA (US)

(72) Inventors: Chang-Sik Choi, Seoul (KR); Stelios Stefanatos, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 460 days.

(21) Appl. No.: 18/041,382

(22) PCT Filed: Oct. 5, 2021

(86) PCT No.: PCT/US2021/053620
§ 371 (c)(1),
(2) Date: Feb. 10, 2023

(87) PCT Pub. No.: WO2022/093499
PCT Pub. Date: May 5, 2022

(65) Prior Publication Data
US 2023/0171068 A1 Jun. 1, 2023

(30) Foreign Application Priority Data
Oct. 29, 2020 (GR) .............................. 20200100656

(51) Int. Cl.
*H04L 5/00* (2006.01)
*H04W 74/08* (2024.01)
(Continued)

(52) U.S. Cl.
CPC ....... *H04L 5/0051* (2013.01); *H04W 74/0816* (2013.01); *H04W 74/085* (2013.01)

(58) Field of Classification Search
CPC ............ H04L 5/0051; H04W 74/0816; H04W 74/085
See application file for complete search history.

(56) References Cited

U.S. PATENT DOCUMENTS

| | | | |
|---|---|---|---|
| 10,470,242 B2 | 11/2019 | Zhang et al. | |
| 10,820,316 B2 | 10/2020 | Zhang et al. | |

(Continued)

FOREIGN PATENT DOCUMENTS

| | | |
|---|---|---|
| CN | 104812057 A | 7/2015 |
| TW | 202027553 A | 7/2020 |

(Continued)

OTHER PUBLICATIONS

Taiwan Search Report—TW110137237—TIPO—Feb. 9, 2025.
(Continued)

*Primary Examiner* — Derrick V Rose
(74) *Attorney, Agent, or Firm* — QUALCOMM Incorporated

(57) ABSTRACT

Aspects relate to group-based reference signal broadcast in a wireless communication network. A first wireless communication device may transmit a first group formation broadcast message associated with a first positioning group comprising a first plurality of wireless communication devices including the first wireless communication device. The first wireless communication device may receive a second group formation broadcast message associated with a second positioning group comprising a second plurality of wireless communication devices including a second wireless communication device. The second positioning group may be associated with a channel occupancy time (CoT) in a sidelink channel. The CoT may comprise transmission opportunities configured to be used by the second plurality of wireless communication devices for communicating reference signals. The first wireless communication device may (Continued)

initiate transmission of reference signals by the first plurality of wireless communication devices using additional transmission opportunities within the CoT associated with the second positioning group.

34 Claims, 18 Drawing Sheets

(51) Int. Cl.
H04W 74/0816 (2024.01)
H04W 74/0833 (2024.01)

(56) References Cited

U.S. PATENT DOCUMENTS

| | | | |
|---|---|---|---|
| 11,696,284 | B2 | 7/2023 | Liu et al. |
| 2017/0339530 | A1 | 11/2017 | Maaref |
| 2019/0140796 | A1 | 5/2019 | Wang et al. |
| 2019/0149364 | A1 | 5/2019 | Sundararajan et al. |
| 2019/0239181 | A1 | 8/2019 | Gangakhedkar et al. |
| 2020/0186290 | A1* | 6/2020 | Zhang .................. H04L 1/0073 |
| 2020/0280465 | A1 | 9/2020 | Kim et al. |
| 2022/0217774 | A1* | 7/2022 | Kim ...................... H04L 5/0053 |
| 2023/0269769 | A1* | 8/2023 | Ganesan ........... H04W 74/0808 370/328 |
| 2024/0214966 | A1* | 6/2024 | Ko ........................ H04L 5/0048 |

FOREIGN PATENT DOCUMENTS

| | | |
|---|---|---|
| WO | 2018093660 A1 | 5/2018 |
| WO | 2018106370 | 6/2018 |
| WO | 2020055764 | 3/2020 |
| WO | WO 202017602 | 9/2020 |

OTHER PUBLICATIONS

International Search Report and Written Opinion—PCT/US2021/053620—ISA/EPO—Jul. 13, 2022.

Partial International Search Report—PCT/US2021/053620—ISA/EPO—Mar. 25, 2022.

Qualcomm Incorporated: "On Unlicensed Positioning and Applicable Use Cases", 3GPP RAN #86, 1 RP-192527, Dec. 9-12, 2019 Sitges, Spain, Dec. 2, 2019, 12 Pages.

* cited by examiner

| Field | Initiator | Anchor | Power | ID (mod N) |
|---|---|---|---|---|
| Value | {0, 1} | {0, 1} | {0, 1} | {0, 1, ..., N} |

Basic Fields

700

702

704

706

708

710

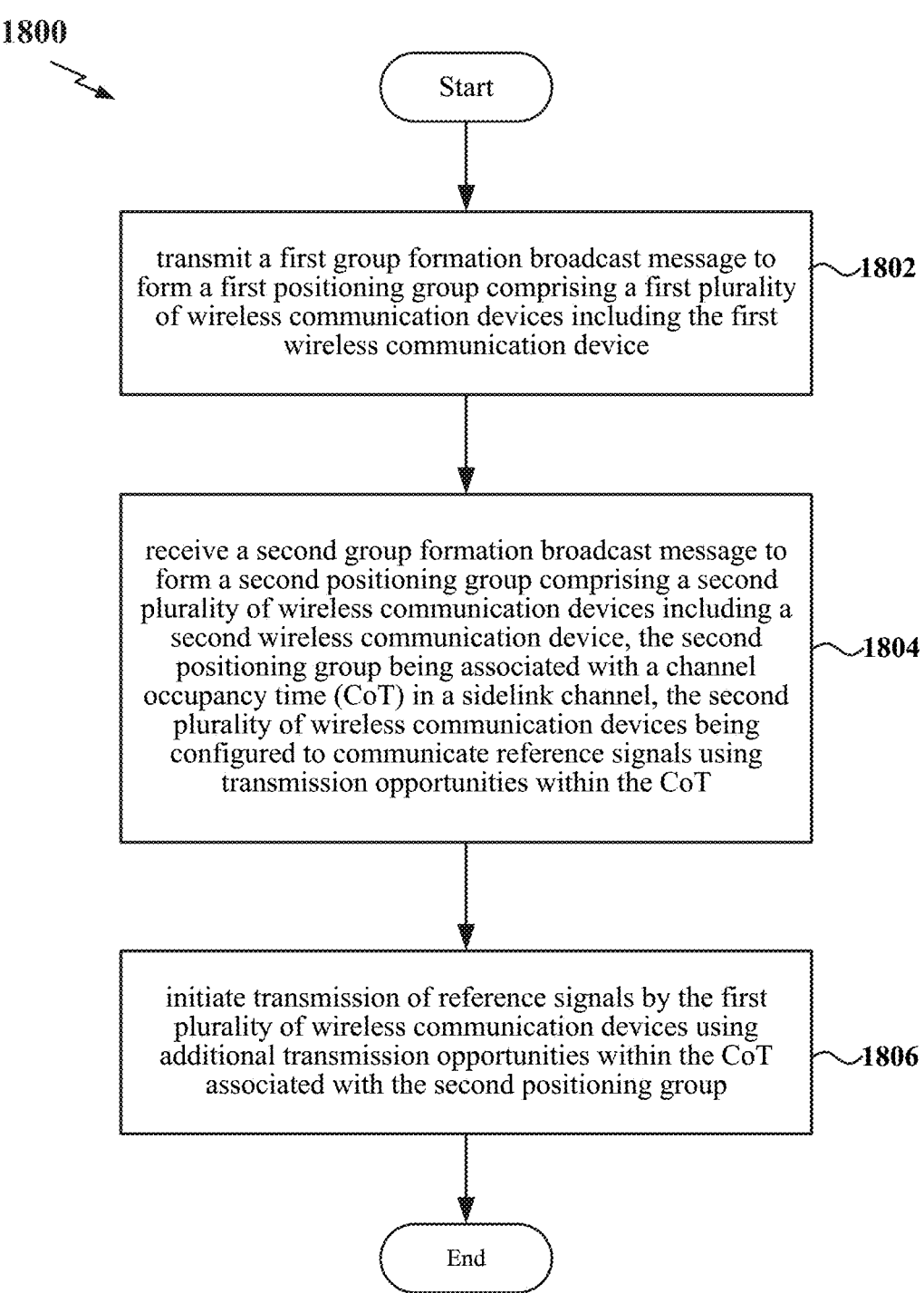

1800

Start transmit a first group formation broadcast message to form a first positioning group comprising a first plurality of wireless communication devices including the first wireless communication device ⟶ 1802 receive a second group formation broadcast message to form a second positioning group comprising a second plurality of wireless communication devices including a second wireless communication device, the second positioning group being associated with a channel occupancy time (CoT) in a sidelink channel, the second plurality of wireless communication devices being configured to communicate reference signals using transmission opportunities within the CoT ⟶ 1804 initiate transmission of reference signals by the first plurality of wireless communication devices using additional transmission opportunities within the CoT associated with the second positioning group ⟶ 1806

End

FIG. 18

LOW-LATENCY OPPORTUNISTIC CHANNEL OCCUPANCY TIME SHARING

BACKGROUND

Field of Disclosure

The technology discussed below relates generally to location estimation for wireless communication devices. More specifically, the technology discussed relates to location estimation using sidelink communication.

Description of Related Art

Wireless communication between devices may be facilitated in various configurations. In one configuration, a cellular network may enable user equipment (UEs) to communicate with one another through signaling with a nearby base station or cell. In another configuration, such as a device to device (D2D) configuration, UEs may signal one another directly, rather than via an intermediary base station or cell. For example, D2D communications may utilize sidelink signaling to facilitate the direct communication between UEs. In some sidelink scenarios, UEs may further communicate in a cellular network, generally under the control of a base station. Thus, the UEs may be configured for uplink and downlink signaling via a base station and further for sidelink signaling directly between the UEs without transmissions passing through the base station.

One example of sidelink wireless communication vehicle-to-everything (V2X) communication. V2X communication involves the exchange of information not only between vehicles themselves, but also between vehicles and external systems, such as streetlights, buildings, pedestrians, and cellular communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles. V2X communication is described here just as an example. Sidelink communication may involve other types of devices and communication interactions. For instance, sidelink communication may be used in interactions between smart phones (e.g., smart-phone-to-smart-phone), Industrial Internet-of-Thing (IIOT) devices (e.g., IIOT-to-IIOT), and/or other types of communications.

While the use of sidelink communication has many benefits, given the ability to communicate directly without an intermediary base station, the de-centralized nature of sidelink communication poses challenges in the management of signaling involving different entities.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a first wireless communication device is disclosed. The method includes transmitting a first group formation broadcast message associated with a first positioning group comprising a first plurality of wireless communication devices including the first wireless communication device. The method further includes receiving a second group formation broadcast message associated with a second positioning group comprising a second plurality of wireless communication devices including a second wireless communication device, the second positioning group being associated with a channel occupancy time (CoT) in a sidelink channel. The CoT may comprise transmission opportunities configured to be used by the second plurality of wireless communication devices for communicating reference signals. The method further includes initiating transmission of reference signals by the first plurality of wireless communication devices using additional transmission opportunities within the CoT associated with the second positioning group.

Another example provides a first wireless communication device in a wireless communication network. The wireless communication device includes a wireless transceiver, a memory, and a processor communicatively coupled to the wireless transceiver and the memory. The processor is configured to transmit a first group formation broadcast message associated with a first positioning group comprising a first plurality of wireless communication devices including the first wireless communication device. The processor is configured to receive a second group formation broadcast message associated with a second positioning group comprising a second plurality of wireless communication devices including a second wireless communication device. The second positioning group may be associated with a channel occupancy time (CoT) in a sidelink channel. The CoT may comprise transmission opportunities configured to be used by the second plurality of wireless communication devices for communicating reference signals. The processor is configured to initiate transmission of reference signals by the first plurality of wireless communication devices using additional transmission opportunities within the CoT associated with the second positioning group.

Another example provides a first wireless communication device in a wireless communication network. The wireless communication device includes means for transmitting a first group formation broadcast message associated with a first positioning group comprising a first plurality of wireless communication devices including the first wireless communication device. The wireless communication device further includes means for receiving a second group formation broadcast message associated with a second positioning group comprising a second plurality of wireless communication devices including a second wireless communication device. The second positioning group may be associated with a channel occupancy time (CoT) in a sidelink channel. The CoT may comprise transmission opportunities configured to be used by the second plurality of wireless communication devices for communicating reference signals. The wireless communication device further includes means for initiating transmission of reference signals by the first plurality of wireless communication devices using additional transmission opportunities within the CoT associated with the second positioning group.

Another example provides a non-transitory computer-readable medium storing instructions therein for execution by one or more processing units. The non-transitory computer-readable medium comprises instructions to transmit a first group formation broadcast message associated with a first positioning group comprising a first plurality of wireless communication devices including the first wireless communication device. The non-transitory computer-readable medium further comprises instructions to receive a second group formation broadcast message associated with a second positioning group comprising a second plurality of wireless communication devices including a second wireless communication device. The second positioning group may be associated with a channel occupancy time (CoT) in a sidelink channel. The CoT may comprise transmission opportunities configured to be used by the second plurality of wireless communication devices for communicating reference signals. The non-transitory computer-readable medium further comprises instructions to initiate transmission of reference signals by the first plurality of wireless communication devices using additional transmission opportunities within the CoT associated with the second positioning group.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Aspects of the disclosure are illustrated by way of example. In the accompanying figures, like reference numbers indicate similar elements.

FIG. 18 is a flow chart 1800 of an exemplary method for group-based PRS broadcast according to some aspects.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
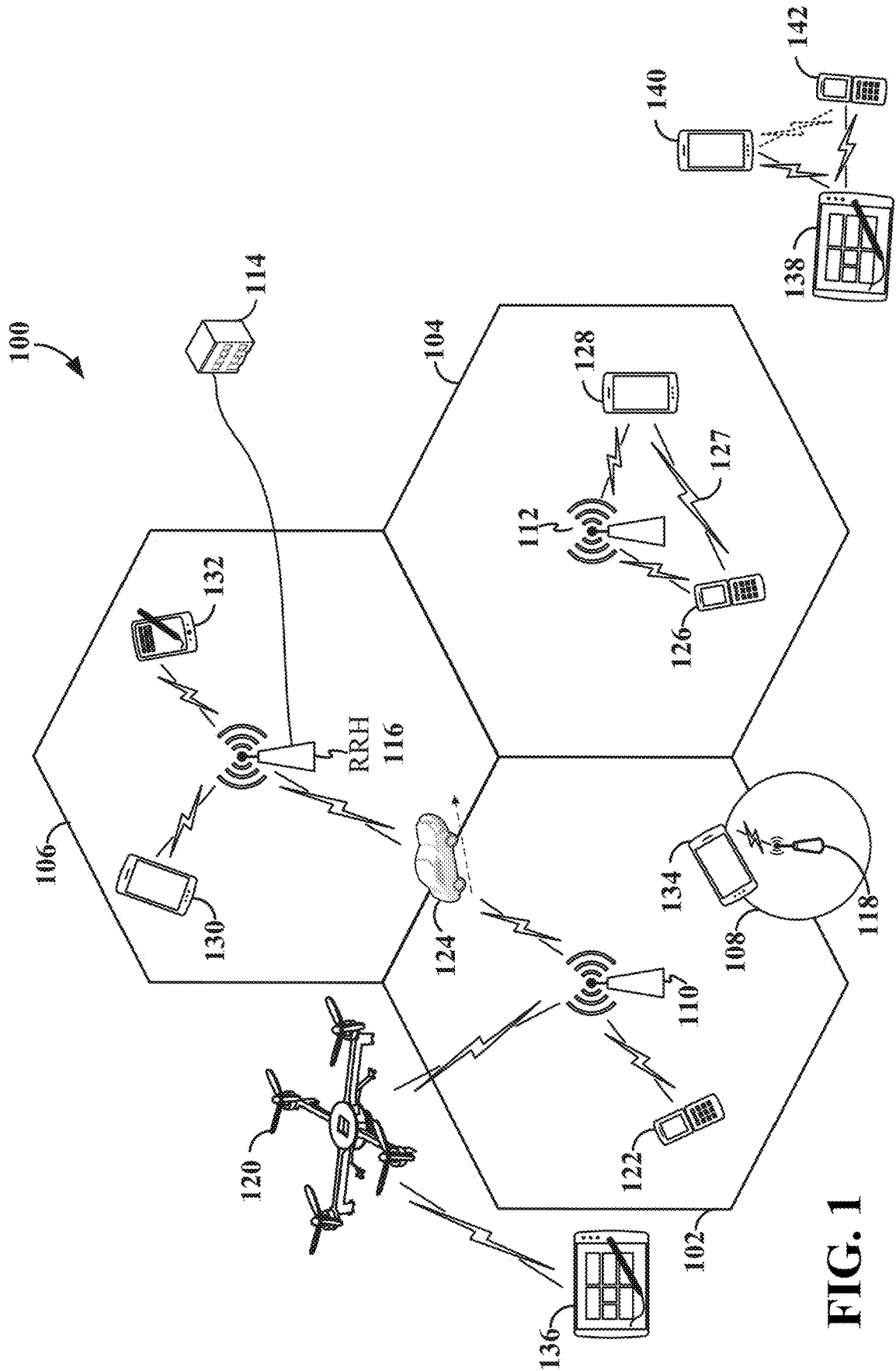
FIG. 1 is a diagram illustrating an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as a user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and/or enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of its location, is referred to as mobility. The various physical channels between the UE and the RAN are generally set up, maintained, and released under the control of an access and mobility management function (AMF, not illustrated) in a core network coupled to the RAN 100. In some scenarios, the AMF may include a security context management function (SCMF) and a security anchor function (SEAF). The SCMF can manage, in whole or in part, the security context for both the control plane and the user plane functionality. The SEAF can perform authentication.

In some examples, the RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. An example of unlicensed spectrum includes the Intelligent Transport Systems (ITS) band in the 5.9 GHz frequency band. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a transmitting sidelink device, and UEs 140 and 142 may function as a scheduled entity or a receiving sidelink device. For example, UE 138 may function as a scheduling entity in a device-to-device (D2D), peer-to-peer (P2P), vehicle-to-everything (V2X), and/or in a mesh network. In a mesh network example, UEs 140 and 142 may optionally communicate directly with one another in addition to communicating with the scheduling entity 138.

In some aspects of the present disclosure, two or more UEs (e.g., UEs 126 and 128) within the coverage area of a serving base station 112 may communicate with each other using sidelink signals 127 without relaying that communication through the base station. In this example, the base station 127 or one or both of the UEs 126 and 128 may function as scheduling entities to schedule sidelink communication between UEs 126 and 128. For example, UEs 126 and 128 may communicate sidelink signals 127 within a vehicle-to-everything (V2X) network.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink or D2D networks other than V2X networks.

Figure 2:
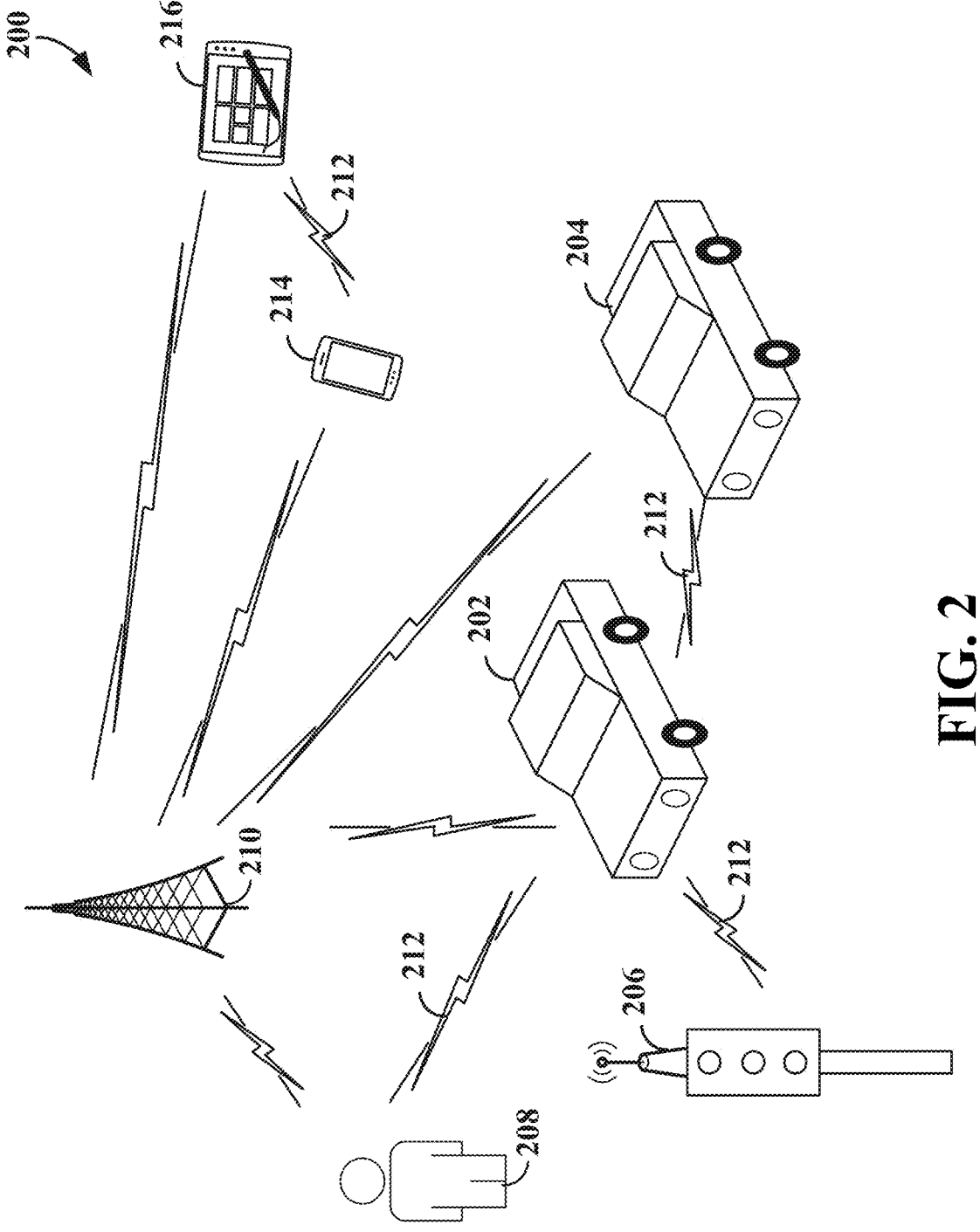
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure 206 (e.g., roadside units (RSUs)), such as streetlights, buildings, traffic cameras, tollbooths or other stationary objects, vehicles 202/204 and pedestrians 208, and vehicles 202/204 and cellular networks (e.g., base station 210). In some examples, V2X communication may be implemented in accordance with the New Radio (NR) cellular V2X standard defined by 3GPP, Release 15 or 16, or other suitable standard.

V2X communication enable vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 occurs over a sidelink channel 212. The sidelink channel 212 may be used to establish a PC5 interface, with or without a wireless network that includes a base station (e.g., base station 210). In instances where a wireless network is involved, the PC5 interface may be directed by the wireless network. For example, the wireless network may direct the PC5 interface over a Uu radio interface established between the UEs (e.g., V-UEs 202, 204, P-UE 208, etc.) and the Radio Access Network (RAN), e.g., base station 210, of the wireless network. In some examples, the sidelink channel 212 may support a proximity service (ProSe) PC5 interface. In various aspects of the disclosure, the sidelink channel 212 implementing a PC5 interface may further be utilized to support D2D communication in other proximity use cases. Examples of other proximity use cases may include public safety or commercial (e.g., entertainment, education, office, medical, and/or interactive) based proximity services.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

In any of the above operational scenarios, the various mobile sidelink devices (e.g., V-UEs 202 and 204, P-UE 208, and other mobile sidelink devices communicating over the sidelink channel 212) may determine their location (e.g., geographical coordinates) in the sidelink network 200 using a sidelink positioning mechanism. To support sidelink positioning, positioning reference signals (PRSs) may be transmitted between the RSUs 206, V-UEs 202 and 204 and P-UEs 208. In some examples, the PRSs may be sequence-based signals and may further be transmitted over unlicensed spectrum (e.g., the ITS band) or licensed spectrum.

Depending on the capabilities of the mobile sidelink devices (e.g., V-UEs 202/204 and P-UE 208), the respective location of each mobile sidelink device may be determined using sidelink-based (SL-b) positioning or sidelink-assisted (SL-a) positioning. In SL-b positioning, each mobile sidelink device computes their own location in a distributed manner using the broadcast PRSs. In SL-a positioning, the RSU 206 or other server in the network computes the locations of mobile sidelink devices. In either SL-a positioning or SL-b positioning, the location of a mobile sidelink device (e.g., V-UE 202) may be determined based on the round-trip time (RTT) between the mobile sidelink device (e.g., V-UE 202) and other sidelink devices (e.g., RSU 206). Such an RTT measurement indicates the distance between the two devices. With a number of such RTT measurements (and corresponding distances), multilateration may be used to determine the location of the mobile sidelink device. For example, V-UE 202 may obtain 3 RTT measurements made with 3 different RSUs. A first RTT measurement may indicate the distance between V-UE 202 and the first RSU. A second RTT measurement may indicate the distance between V-UE 202 and the second RSU. A third RTT measurement may indicate the distance between V-UE 202 and the third RSU. If the location of the three RSUs are known, then the location of V-UE 202 may be determined by multilateration, e.g., using the three distances as radii of circles centered at the known RSU locations.

Figure 3:
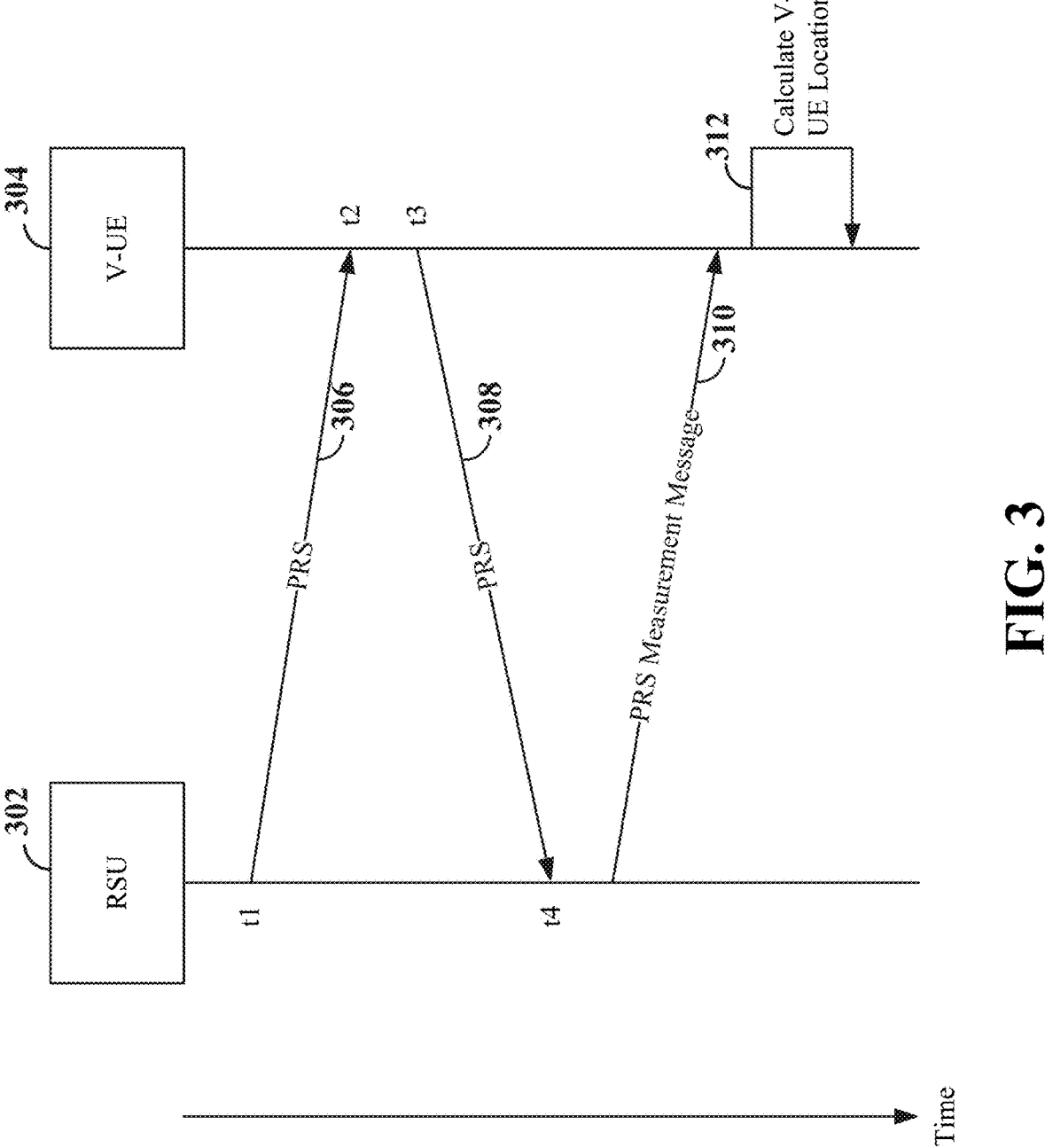
FIG. 3 is a signaling diagram illustrating an example of sidelink-based positioning according to some aspects.

FIG. 3 is a signaling diagram illustrating an example of sidelink-based (SL-b) positioning according to some aspects. In the example shown in FIG. 3, a V-UE 304 is shown communicating with an RSU 302 over a sidelink channel. In some examples, the sidelink channel may include unlicensed spectrum (e.g., the ITS frequency band). The V-UE 304 may correspond, for example, to any of the V-UEs 202 or 204 shown in FIG. 2. In addition, the RSU 302 may correspond, for example, to the RSU 206 shown in FIG. 2. It should be understood that the signaling diagram shown in FIG. 3 may be implemented between any two wireless communication devices (e.g., RSU, V-UE, P-UE, etc.), and may further be implemented between more than two wireless communication devices (e.g., between the V-UE 304 and multiple RSUs 302, between one or more RSUs and one or more P-UEs or V-UEs, and/or between the V-UE and two or more other V-UEs or P-UEs).

FIG. 3 illustrates one RTT measurement. The RTT measurement involves the exchange of PRS signals 306 and 308. PRS signal 306 represents propagation of a signal in one direction, from RSU 302 to V-UE 304. PRS signal 308 represents propagation of a signal in the opposite direction, from V-UE 304 to RSU 302, thus completing the round trip. In the example shown in FIG. 3, time is illustrated in the vertical direction to depict the transmission and reception of signals over time. For example, at 306, the RSU 302 broadcasts a first PRS over the sidelink channel at an initial time (t1). The first PRS may include, for example, a PRS sequence. The PRS sequence may be a wideband random sequence that is broadcast over an unlicensed frequency band. In some examples, the PRS may include a sequence identifier (ID) identifying the PRS sequence. The first PRS may be received at the V-UE 304 at a second time (t2) subsequent to t1. At 308, the V-UE 304 broadcasts a second PRS over the sidelink channel at a third time (t3), which is received at the RSU 302 at a fourth time (t4). Thus, the RTT measurement comprises the first propagation time, (t2–t1), and the second propagation time, (t4–t3). That is, RTT=(t2–t1)+(t4–t3), which can be re-arranged as RTT=(t4–t1)–(t3–t2). The V-UE 304 can locally determine the time difference (t3–t2). The RSU 302 can locally determine the time difference (t4–t1). These two time differences can be combined at the RSU 302, at the V-UE 304, or at another location, to compute the RTT.

For example, if the RTT is to be computed at the V-UE 304 (e.g., SL-b positioning), the V-UE 304 may locally determine the time difference (t3–t2) and receive a PRS message 310 from the RSU 302 that includes, as a payload, the time difference (t4–t1). The PRS message may include other information as well. As shown in FIG. 3, the RSU 302 transmits a PRS measurement message including various positioning information to the V-UE 304 over the sidelink channel. For example, the positioning information included in a payload of the PRS measurement message may include the time of departure (t1) of the first PRS and the time of arrival (t4) of the second PRS (either individually as t1 and t4 or as a time difference (t4–t1)). Other positioning information may include the PRS sequence ID, clock error noise standard deviation of the RSU 302, clock drift standard deviation of the RSU 302, location of the RSU 302 and other suitable information. The PRS measurement message may further include the respective UE IDs (e.g., Layer 2 (L2) medium access control (MAC) IDs) of the RSU 302 and V-UE 304.

Thus, at 312, the V-UE 304 may calculate the RTT based on the positioning information included in the PRS measurement message, the time of arrival (t2) of the first PRS, the time of departure (t3) of the second PRS, and the clock error (e.g., clock drift standard deviation and clock error noise standard deviation) of the V-UE 304 determined using its own Kalman filter. For example, if multiple RTT measurements are made, the nth RTT may be expressed as:

$$z_n = (t_4 - t_3) + (t_2 - t_1) = \frac{\|r - x(t_n)\|}{v_{light}} + \alpha, \qquad \text{(Equation 1)}$$

where $v_{light}$ is the speed of light, a is an adjustment parameter based on the clock error of the RSU 302 and V-UE 304, r is the location of the RSU 302 and x is unknown.

In examples in which SL-a positioning is utilized, the V-UE 304 can transmit a PRS measurement message to the RSU 302 including, for example, the time of arrival (t2) of the first PRS, the time of departure (t3) of the second PRS, and other positioning information, such as the clock error of the V-UE 304, speed of the V-UE 304, and location of the V-UE 304 at the time of PRS broadcast (if known).

While positioning reference signals (PRSs) are used as examples to illustrate various aspects, different types of reference signals may be used. For instance, a sounding reference signals (SRSs) may be used instead. Typically, an SRS is transmitted by a user equipment (UE) in the uplink direction and used by the eNodeB to estimate the uplink channel quality over a wider bandwidth. The eNodeB may use the channel quality information for uplink frequency selective scheduling. The SRS is just one alternative. Other types of reference signals may be used to in place of the PRSs referred to herein.

Figure 4:
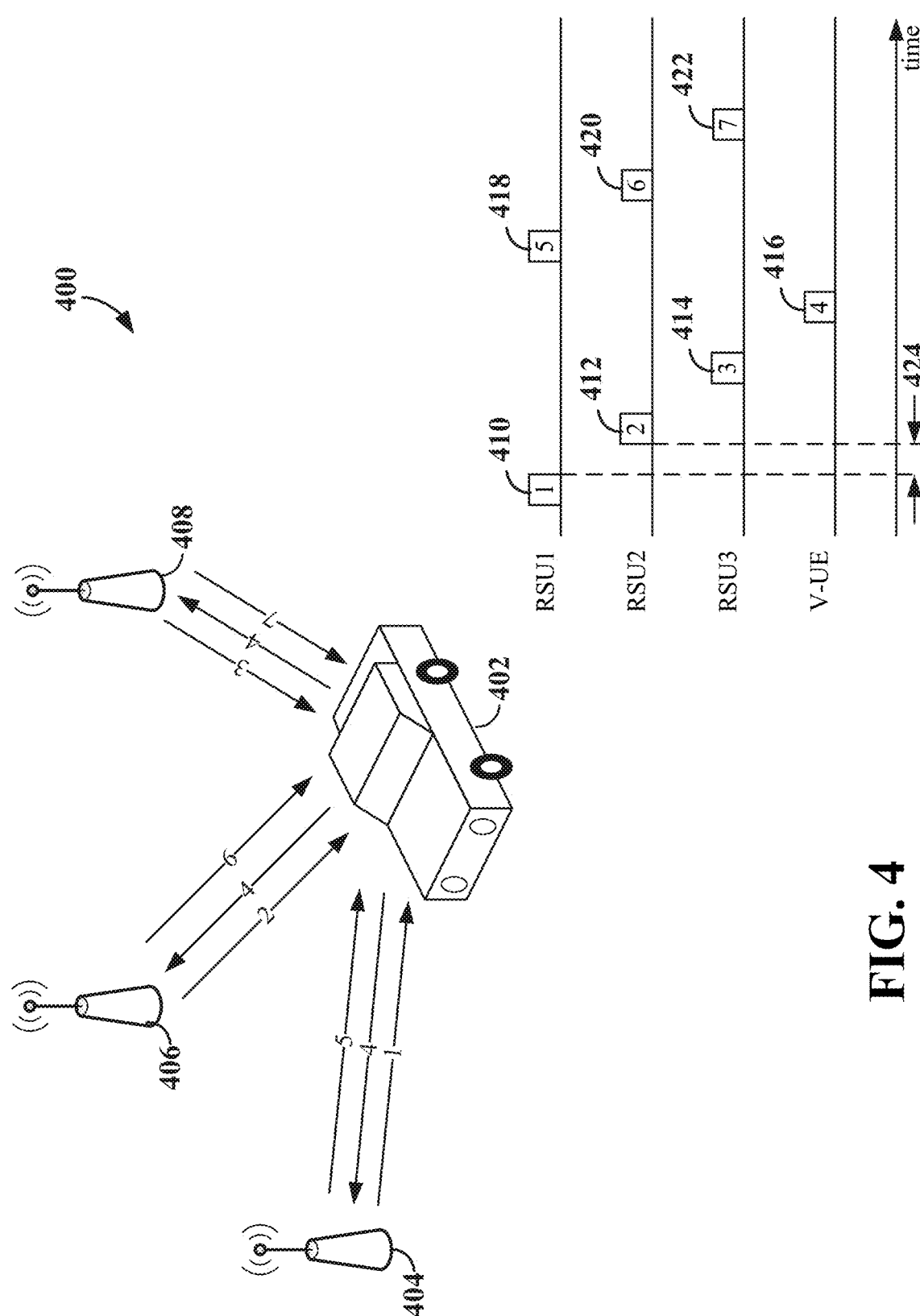
FIG. 4 is a diagram illustrating an example of transmission of positioning reference signals (PRSs) in a sidelink communication network according to some aspects.

FIG. 4 is a diagram illustrating an example of transmission of positioning reference signals (PRSs) in a sidelink communication network 400 according to some aspects. In the example shown in FIG. 4, a V-UE 402 is shown in wireless communication with a plurality of RSUs 404, 406, and 408 over a sidelink channel. In some examples, the sidelink channel may include unlicensed spectrum (e.g., the ITS frequency band). The V-UE 402 may correspond, for example, to any of the V-UEs shown in FIG. 2 and/or FIG. 3. In addition, the RSUs 404, 406, and 408 may correspond, for example, to any of the RSUs shown in FIG. 2 and/or FIG. 3. It should further be understood that, in some examples, the V-UE 402 may be a P-UE or other mobile sidelink device. In addition, one or more of the RSUs 404, 406, and 408 may be other V-UEs, P-UEs, and/or other mobile sidelink devices.

FIG. 4 further illustrates the PRS communication between the V-UE 402 and the RSUs 404, 406, and 408 over time. For example, a first PRS 410 (denoted signal 1) may be broadcast from the RSU 404, followed by a second PRS 412 (denoted signal 2) broadcast from the RSU 406, followed by a third PRS 414 (denoted signal 3) broadcast by the RSU 408, followed by a fourth PRS 416 (denoted signal 4) broadcast by the V-UE 402. Upon receipt of the fourth PRS 416 by each of the RSUs 404, 406, and 408, each of the RSUs 404, 406, and 408 may then transmit a respective PRS measurement signal 418, 420, and 422 (denoted signals 5, 6, and 7) to the V-UE 402. The V-UE 402 may then calculate its location based on the PRS measurement signals 418, 420, and 422, time of departure of the fourth PRS 416, and the respective time of arrivals at the V-UE 402 of the other PRSs 410, 412, and 414, as discussed above. For example, the PRS 410 and PRS 416 (denoted signals 1 and 4), along with the PRS measurement signal 418 (denoted signal 5), may constitute a first RTT measurement. The PRS 412 and PRS 416 (denoted signals 2 and 4), along with the PRS measurement signal 420 (denoted signal 6), may constitute a second RTT measurement. The PRS 414 and PRS 416 (denoted signals 3 and 4), along with the PRS measurement signal 422 (denoted signal 7), may constitute a third RTT measurement. Having obtained the three RTT measurements, the V-UE 402 may determine its own location by performing trilateration, using the known locations of the RSUs 404, 406, and 408.

The efficiency and accuracy of SL-b positioning (or SL-a positioning) depends on the latency (e.g., time gap 424) between the PRSs 410, 412, 414, and 416. When implementing listen-before-talk (LBT) or another channel sensing mechanism to access the sidelink channel, the availability of the sidelink channel to each wireless communication device (e.g., V-UE 402, RSU 404, RSU 406, and RSU 408) may vary, thus impacting the PRS latency.

Therefore, in various aspects of the disclosure, the wireless communication devices (e.g., V-UEs, P-UEs, RSUs, etc.) communicating over a sidelink channel in a sidelink wireless communication network may be grouped into one or more positioning groups. Within each positioning group, a respective order of the wireless communication devices in the positioning group may be identified. The wireless communication devices in a particular positioning group (e.g., the positioning group members) may then communicate PRSs therebetween over the sidelink channel based on the determined order of wireless communication devices. For example, the sidelink channel may be reserved for a channel occupancy time (CoT) within which each of the wireless communication devices in the positioning group may broadcast PRSs in the positioning group and communicate PRS measurement messages to other positioning group members, thus reducing the PRS latency.

In some examples, the wireless communication devices may be configured to form positioning groups by broadcasting group formation broadcast messages over the sidelink channel. One of the wireless communication devices in each positioning group may be considered an initiator device that initiates the positioning group, while the other wireless communication devices in the positioning group may be considered responder devices. For example, an initiator device may broadcast an initiator (or first) group formation broadcast message to form a positioning group. Other wireless communication devices that receive the initiator group formation broadcast message may then respond with subsequent responder group formation broadcast messages that identify the initiator device and other responder devices that previously responded to the first group formation broadcast message. Thus, the responder group formation broadcast messages may build on one another such that the last responder group formation broadcast message identifies the initiator device and all of the other responder devices in the positioning group.

The initiator device may then determine the order of wireless communication devices in the positioning group from each of the responder group formation broadcast messages and transmit (e.g., broadcast or groupcast) a group association broadcast message that identifies the members of the positioning group and the order thereof. The initiator device may then reserve the sidelink channel for a CoT based on the number of wireless communication devices in the positioning group and broadcast the first PRS during the CoT. Responder devices may then each broadcast their respective PRS within the CoT based on the order of wireless communication devices. Thus, the respective transmission timing of each of the PRSs from each of the wireless communication devices in the positioning group may be determined from the order.

As discussed, a message such as group formation message (GFM) or group association message (GAM) may be transmitted in the form of a broadcast message. Such a broadcast message may be "broadcast" or "groupcast" to various devices. In this sense, "broadcasting" refers to transmission to two or more devices. All devices within the signal range of the broadcast may be able to receive the message. By contrast, "groupcasting" refers to reception by only a subset of device within the signal range. For example, the signal associated with a groupcast message may reach a set ("A") of devices. However, the groupcast may only be intended for and can only be decoded by a sub-set ("B") of devices within the set "A" of devices.

In some examples, LBT may be used to reserve the sidelink channel. For example, the initiator device (e.g., RSU, V-UE, P-UE, etc.) may conduct an LBT procedure to determine whether it can reserve the sidelink channel. In some aspects, an LBT procedure may involve sensing energy on the channel and comparing the energy to an energy detection (ED) threshold. For example, if the detected energy on the channel is at or below the ED threshold level (e.g., indicating that the channel is relatively free of traffic), the initiator device may reserve the sidelink channel for a CoT and transmit the first PRS.

Different types of LBT procedures may be defined according to different categories. For example, Category 1 (Cat. 1) LBT specifies that LBT is not used. Cat. 2 LBT specifies the use of LBT without random back-off. Cat. 3 LBT specifies the use of LBT with random back-off with a fixed size contention window. Cat. 4 LBT specifies the use of LBT with random back-off with a variable sized contention window. In an aspect, the initiator device may implement Cat 4 LBT to reserve the CoT for all positioning group members. Thereafter, the responder devices may implement Cat 2 LBT to broadcast their PRSs.

In some examples, the wireless communication devices in a sidelink communication network may be categorized as either anchor devices or non-anchor devices. Anchor devices may include, for example, RSUs (e.g., RSUs 404, 406, and 408), along with V-UEs (e.g., V-UE 402) and P-UEs that include an accurate internal positioning device (e.g., GPS or other navigation system). Non-anchor devices may include, for example, V-UEs and P-UEs that do not include accurate internal positioning devices. Thus, anchor devices may be considered to have a known location based on a location accuracy (e.g., an allowed accuracy tolerance or deviation) and non-anchor devices may be considered to have an unknown location based on the location accuracy.

In some aspects, initiator devices may include anchor devices, whereas responder devices may include at least non-anchor devices. In some examples, an anchor device that receives a group formation broadcast message from another anchor initiator device may either become a responder device for that initiator device or become an initiator device for another positioning group. For example, the anchor device may compare a reference signal received power (RSRP) of the group formation broadcast message received from another anchor initiator device to determine whether to become a responder device for the other initiator device. As an example, if the RSRP of the received group formation broadcast message is greater than or equal to a threshold (threshold power), the anchor device may become a responder device. Otherwise, if the RSRP of the received group formation broadcast message is less than the threshold, the anchor device may become an initiator device for another positioning group. In this example, the other anchor initiator device may be excluded from the positioning group (e.g., the other anchor initiator device may form its own, separate positioning group).

Similarly, for responder devices, if multiple group formation broadcast messages are received from multiple anchor initiator devices, a responder device may select one of the anchor initiator devices and join the positioning group of the selected anchor initiator device (e.g., by transmitting a responder group formation broadcast message including the selected anchor initiator device ID). In some examples, each positioning group can be configured with a maximum number of members. If the maximum number of members has been reached for one of the positioning groups, the responder device may select the other positioning group or may become an initiator if no other positioning group is available. In some examples, a non-anchor device may not receive a group formation broadcast message from any anchor initiator devices. In this example, the non-anchor device may become an initiator device to initiate a positioning group for the non-anchor device In some examples, positioning group formation may be performed periodically. For example, group formation broadcast messages associated with new positioning groups may be broadcast at a periodicity less than (e.g., with a longer duration than) the periodicity of a PRS cycle to enable the positioning groups to complete multiple PRS cycles before changing positioning groups. In some examples, a PRS cycle may be 100 ms. In this example, positioning group formation may be performed every 1000 ms.

For example, positioning group formation may be performed in a group phase in a time domain. The group phase may be followed by a PRS phase including one or more PRS cycles. The group phase may further include an initiator sub-phase and a responder sub-phase. Anchor devices may transmit initiator group formation broadcast messages within the initiator sub-phase. Responder devices may transmit responder group formation broadcast messages within the responder sub-phase. In addition, a non-anchor device that did not receive an initiator group formation broadcast message within the initiator sub-phase may transmit an initiator group formation broadcast message within the responder sub-phase. The group phase may further include a second initiator sub-phase after the responder sub-phase within which an initiator device may transmit a group association broadcast message identifying the members of the positioning group and the order thereof.

Figure 5:
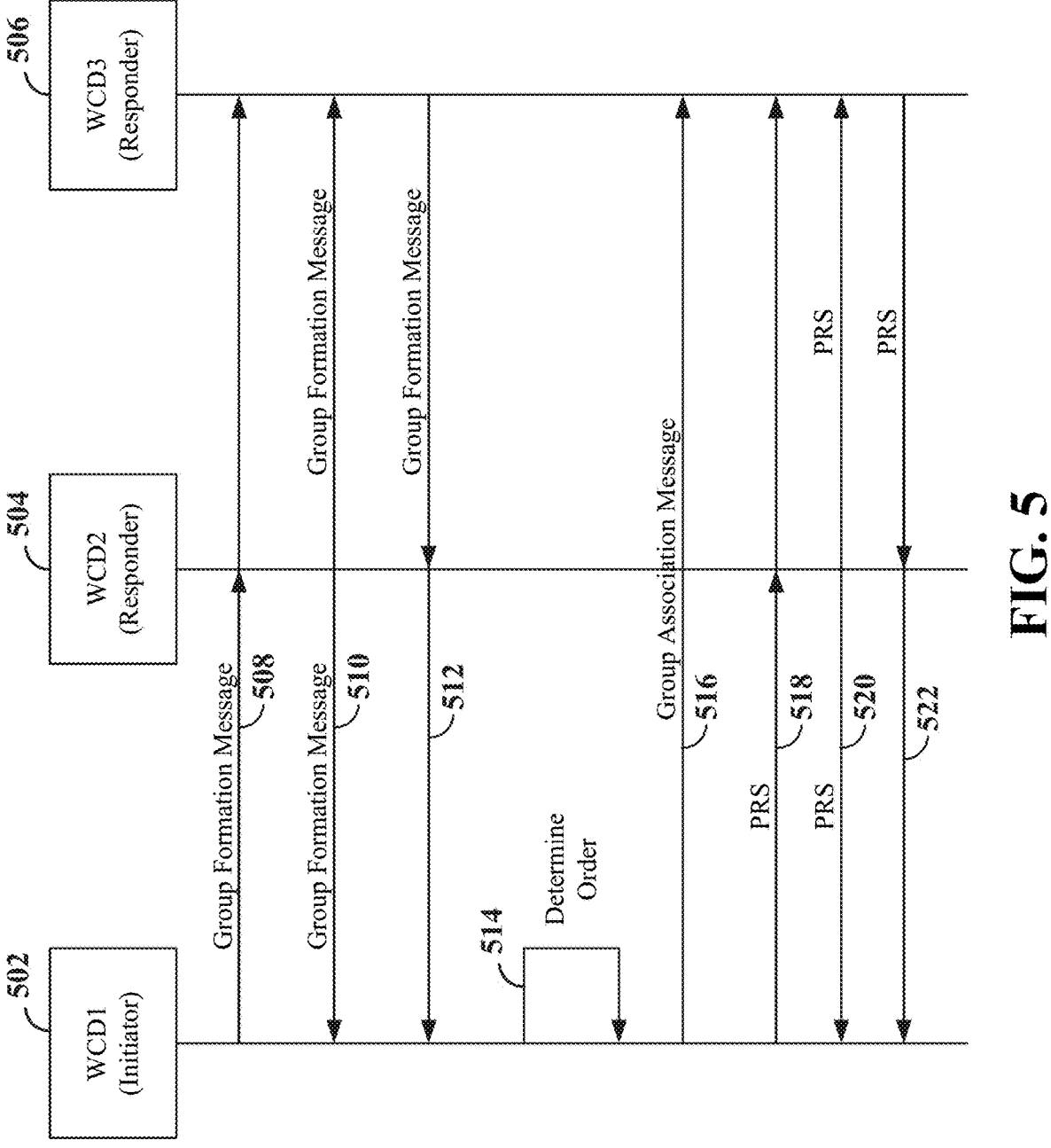
FIG. 5 is a signaling diagram illustrating an example of positioning group formation for group-based PRS broadcast according to some aspects.

FIG. 5 is a signaling diagram illustrating an example of positioning group formation for group-based PRS broadcast according to some aspects. In the example shown in FIG. 5, an initiator wireless communication device (WCD1) 502 is in wireless communication with responder wireless communication devices 504 and 506 (WCD2 and WCD3, respectively) over a sidelink channel. In some examples, the sidelink channel may include unlicensed spectrum (e.g., the ITS spectrum). In other examples, the sidelink channel may include licensed spectrum. The sidelink channel may utilize LBT or another channel sensing mechanism for channel access.

Each of the wireless communication devices 502, 504, and 506 may correspond to any of the RSUs, V-UEs, or P-UEs shown in FIGS. 2, 3, and/or 4. In some examples, the initiator wireless communication device 502 (referred to herein as an initiator device, for simplicity) may be an anchor device. In other examples, the initiator device 502 may be a non-anchor device in examples in which a group formation broadcast message is not received from an anchor device. The responder wireless communication devices 504 and 506 (referred to herein as responder devices, for simplicity) may be non-anchor devices or anchor devices (e.g., if the initiator device 502 is in close proximity to the anchor devices).

At 508, the initiator device 502 may broadcast (or groupcast) a first group formation broadcast message over the sidelink channel to form a positioning group. At 510, the responder device 504 may broadcast (or groupcast) a second group formation broadcast message over the sidelink channel to join the positioning group. The second group formation broadcast message may include, for example, an initiator ID of the initiator device. At 512, the responder device 506 may broadcast (or groupcast) a third group formation broadcast message over the sidelink channel to join the positioning group. The third group formation may include, for example, the initiator ID of the initiator device and a responder ID of the responder device 504. Each of the first, second, and third group formation messages may further include other device information associated with the transmitting device. Examples of device information may include, but are not limited to, initiator information indicating whether the transmitting device is the initiator device of the positioning group, anchor information indicating whether the transmitting device is an anchor device or a non-anchor device, power information indicating whether the transmitting device is power limited (e.g., operating in a discontinuous reception mode), and a group ID identifying the transmitting device within the positioning group. In some examples, the group ID may be a random number within the group. In other examples, the group ID may be the UE ID (e.g., MAC ID) of the transmitting device.

At 514, the initiator device 502 may determine an order of the wireless communication devices 502, 504, and 506 within the positioning group. For example, upon receiving each of the second and third group formation messages, the initiator device 502 may include the responder devices 504 and 506 within the positioning group. The initiator device 502 may then be listed first in the order of wireless communication devices, followed by the other responder devices 504 and 506. Various factors may be used by the initiator device 502 to determine the order of the responder devices 504 and 506. For example, the order of responder devices 504 and 506 may be determined based on the device information contained within the group formation messages. In an example, the order may correspond to a descending order of responder devices.

At 516, the initiator device 502 may broadcast or groupcast a group association broadcast message to the responder devices 504 and 506. The group association message may include the initiator ID of the initiator device and the respective responder IDs of each of the responder devices 504 and 506 listed in the order of wireless communication devices (e.g., descending order).

At 518, 520, and 522, the initiator device 502 and responder devices 504 and 506 may each broadcast (or groupcast) a respective PRS based on the order of wireless communication devices listed in the group association message. For example, the initiator device 502 may broadcast (or groupcast) a first PRS at 518. Then, at 520, the responder device 504 may broadcast (or groupcast) a second PRS. Then, at 522, the responder device 506 may broadcast a third PRS. In some examples, the initiator device 502 may implement Cat 4 LBT to transmit the first PRS and reserve the sidelink channel for a CoT within which all of the PRSs (and corresponding PRS measurement messages) may be transmitted. Thereafter, the responder devices 504 and 506 may implement Cat 2 LBT to broadcast their PRSs.

As mentioned previously, while positioning reference signals (PRSs) are used as examples to illustrate various aspects, different types of reference signals, such as sounding reference signals (SRSs) or other types of signals, may be used instead.

Figure 6:
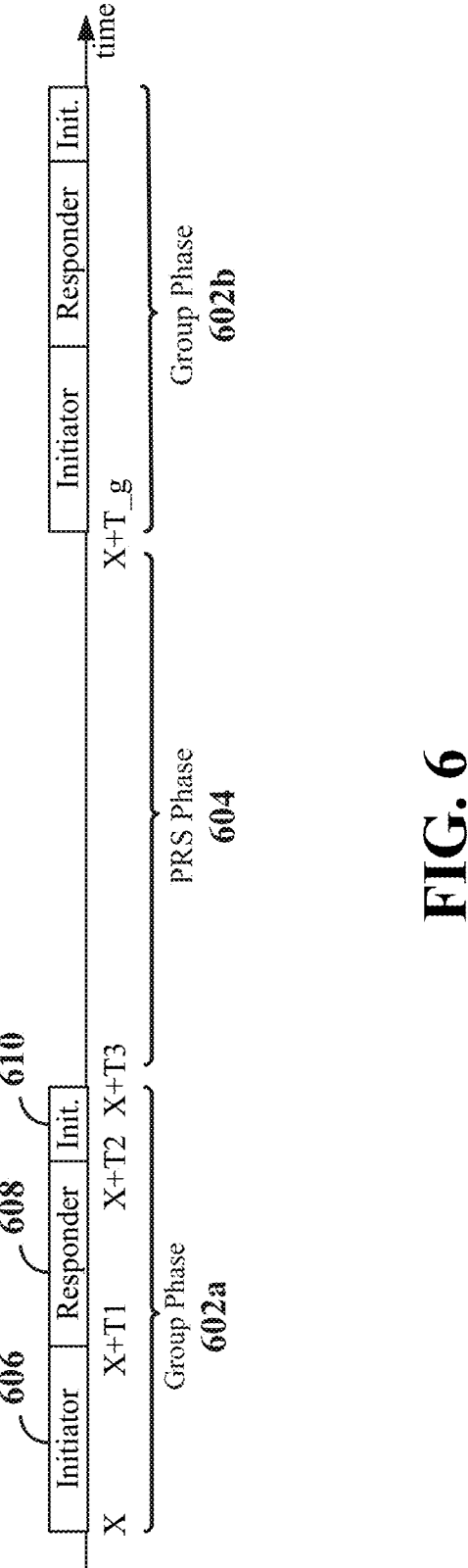
FIG. 6 is a diagram illustrating an example of time domain allocation for positioning group formation and group-based PRS broadcast according to some aspects.

FIG. 6 is a diagram illustrating an example of time domain allocation for positioning group formation and group-based PRS broadcast according to some aspects. In the example shown in FIG. 6, the sidelink channel may be time-divided into group phases (two of which 602a and 602b are illustrated, for simplicity) and PRS phases (one of which 604 is illustrated, for simplicity). The PRS phase 604 includes one or more PRS cycles. Each PRS cycle includes group-based PRSs broadcast by one or more positioning groups. For example, within a PRS cycle, the wireless communication devices within each positioning group may broadcast their PRSs (and corresponding PRS measurement messages) within respective CoTs reserved by the respective initiator devices. In some examples, the periodicity of the group phases 602a and 602b is less than the periodicity of the PRS cycles. For example, a PRS cycle may be 100 ms, and the periodicity of the group phases 602a and 602b may be 1000 ms. Thus, ten PRS cycles may occur between group phases 602a and 602b.

Each group phase 602a and 602b may be further time-divided into a first initiator sub-phase 606, a responder sub-phase 608, and a second initiator sub-phase 610. Within the first initiator sub-phase 606, anchor devices may transmit initiator group formation messages to initiate positioning groups. Within the responder sub-phase 608, responder devices (e.g., non-anchor devices and anchor devices within a close proximity to another anchor device that broadcast an initiator group formation message in the initiator sub-phase 606) may broadcast responder group formation messages. Within the second initiator sub-phase 610, initiator devices may broadcast or groupcast group association messages identifying the members of their respective positioning group and the respective PRS broadcast order of the members in their respective positioning group.

In the example shown in FIG. 6, an anchor device may broadcast (or groupcast) its initiator group formation message at a time $Unif(X+0, X+T1)$, where T1 is the time budget for the anchor devices to broadcast their group formation messages. In some examples, T1=100 ms. Here, X refers to the periodicity of the group phases 602a and 602b (e.g., X=0 ms, 1,000 ms, 2000 ms, 3000 ms, . . . ). In some examples, each subsequent group phase (e.g., group phase 602b) may begin after a time gap $(X+T\_g)$ from the end of the PRS phase 604 to minimize interference on the sidelink channel. Similarly, a responder device may broadcast its responder group formation message at a time $Unif(X+T1, X+T2)$, where T2 is the time budget for the responder devices to broadcast their group formation messages. In some examples, T2≥100 ms. Then, each initiator device may broadcast its group association message at a time $Unif(X+T2, X+T3)$, where T3 is the time budget for the initiator devices to broadcast their group association messages. In some examples, T3≤100 ms.

Figure 7:
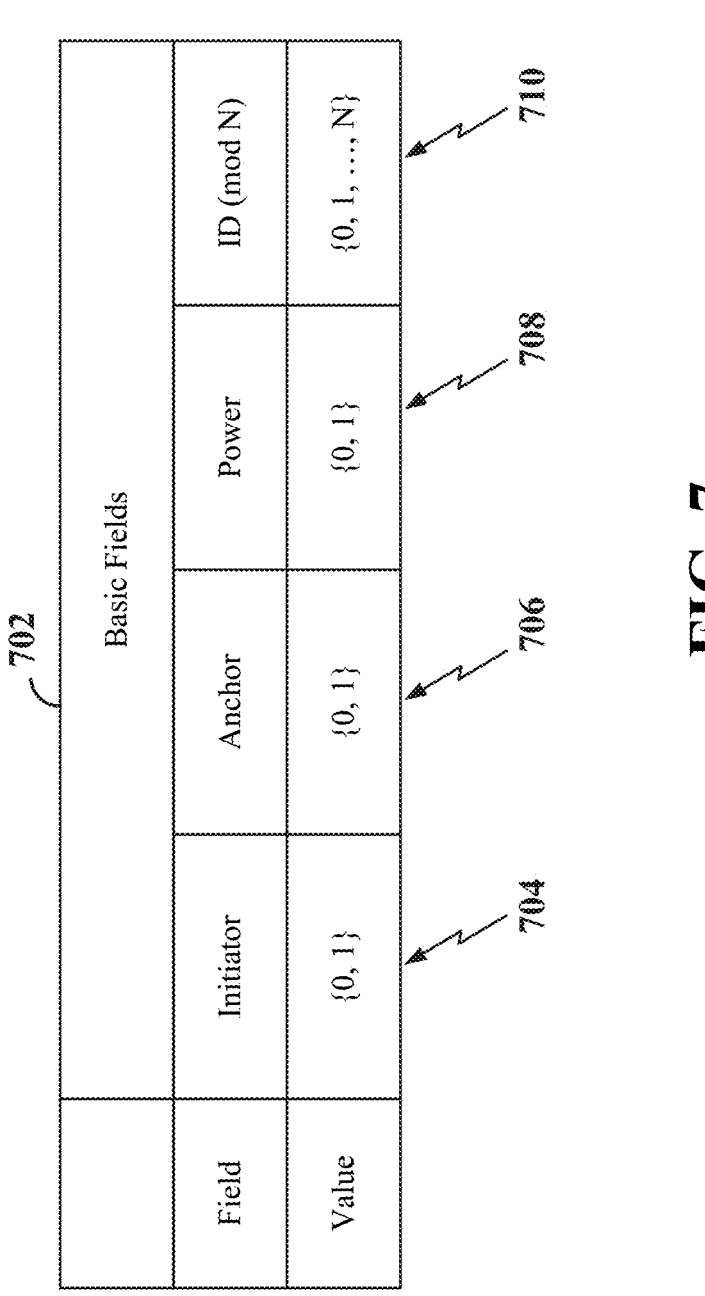
FIG. 7 is a diagram illustrating an example of a group formation broadcast message transmitted by a group initiator according to some aspects.

FIG. 7 is a diagram illustrating an example of a group formation broadcast message 700 that may be transmitted by a group initiator according to some aspects. The group formation broadcast message 700 payload includes a plurality of basic fields 702 carrying device information. The group formation broadcast message may further include a header (not shown) that may include, for example, the UE ID (e.g., MAC ID) of the transmitting device (e.g., an initiator device). The basic fields 702 may include, for example, an initiator field 704 carrying initiator information, an anchor field 706 carrying anchor information, a power field 708 carrying power information, and a group ID field 710 carrying a group ID for the transmitting device. The initiator information 704 indicates whether the transmitting device is the initiator device of the positioning group. For example, the initiator information 704 may include a single bit I={0, 1}, where I=1 indicates that the transmitting device is an initiator device and I=0 indicates that the transmitting device is a responder device. The anchor information 706 indicates whether the transmitting device is an anchor device or a non-anchor device. For example, the anchor information 706 may include a single bit A={0, 1}, where A=1 indicates that the transmitting device is an anchor device and A=0 indicates that the transmitting device is a non-anchor device.

The power information 708 indicates whether the transmitting device is power limited (e.g., operating in a DRX mode). For example, the power information 708 may include a single bit P={0, 1}, where P=1 indicates that the transmitting device is power limited. For P=1 devices, the PRS cycle periodicity may be less than a regular PRS cycle periodicity to accommodate the DRX mode of the transmitting device. Therefore, transmitting devices having P=1 may not transmit a PRS within each PRS cycle during the PRS phase. The group ID 710 identifies the transmitting device within the positioning group. In some examples, the group ID may be a random number within the group. For example, as shown in FIG. 7, the group ID may be a single bit ID={0, 1, . . . , N}, selected from mod(N). In other examples, the group ID may be the UE ID (e.g., MAC ID) of the transmitting device.

Figure 8:
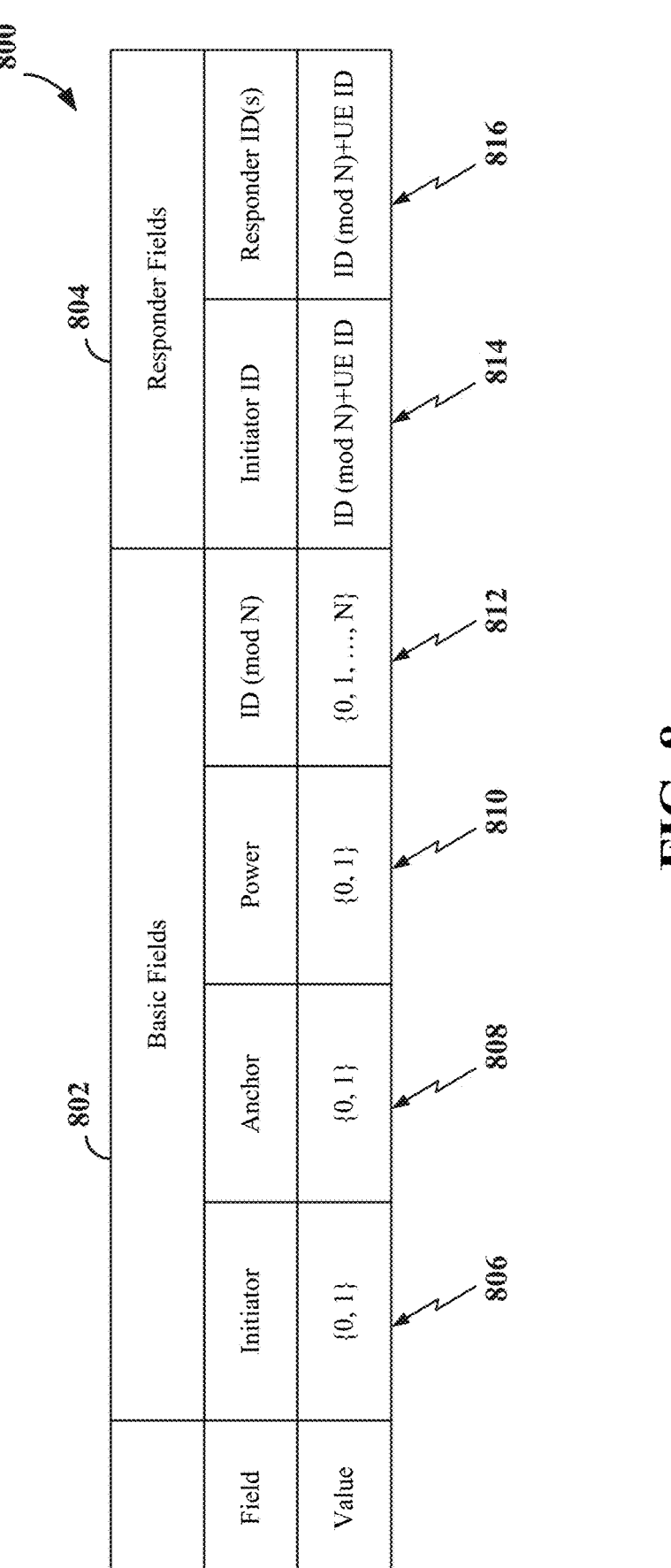
FIG. 8 is a diagram illustrating an example of a group formation broadcast message transmitted by a group responder according to some aspects.

FIG. 8 is a diagram illustrating an example of a group formation broadcast message 800 that may be transmitted by a group responder according to some aspects. In the example shown in FIG. 8, the group formation broadcast message 800 payload includes basic fields 802 and responder fields 804. The group formation message 800 may further include a header (not shown) that includes, for example, the UE ID (e.g., MAC ID) of the transmitting responder device. The basic fields 802 include the same fields as shown in FIG. 7 and carry the device information of the transmitting device (e.g., responder device transmitting the group formation message 800). For example, the basic fields 802 include an initiator field 806 carrying initiator information, an anchor field 808 carrying anchor information, a power field 810 carrying power information, and a group ID field 812 carrying a group ID for the transmitting device, as discussed above in connection with FIG. 7.

The responder fields 804 may include an initiator ID field 814 carrying an initiator ID of the initiator device for the positioning group and a responder ID field 816 carrying a list of responder IDs. Each of the responder IDs included in the responder ID field 816 is associated with a responder device that previously transmitted a responder group formation message 800 in the responder sub-phase including the initiator ID of the initiator device of the positioning group and responder IDs of other responder devices that previously transmitted other responder group formation messages 800. In some examples, the initiator ID and responder IDs may be UE IDs for each of the initiator and responder devices. In other examples, the initiator ID and responder IDs may each be based on the respective group IDs of the initiator and responder devices. For example, the initiator ID may include a concatenation of the initiator group ID and initiator UE ID. In addition, the responder IDs may each include a concatenation of the respective responder group ID and the respective responder UE ID. As another example, the initiator ID and responder IDs may include the initiator group ID and responder group IDs, respectively.

Figure 9:
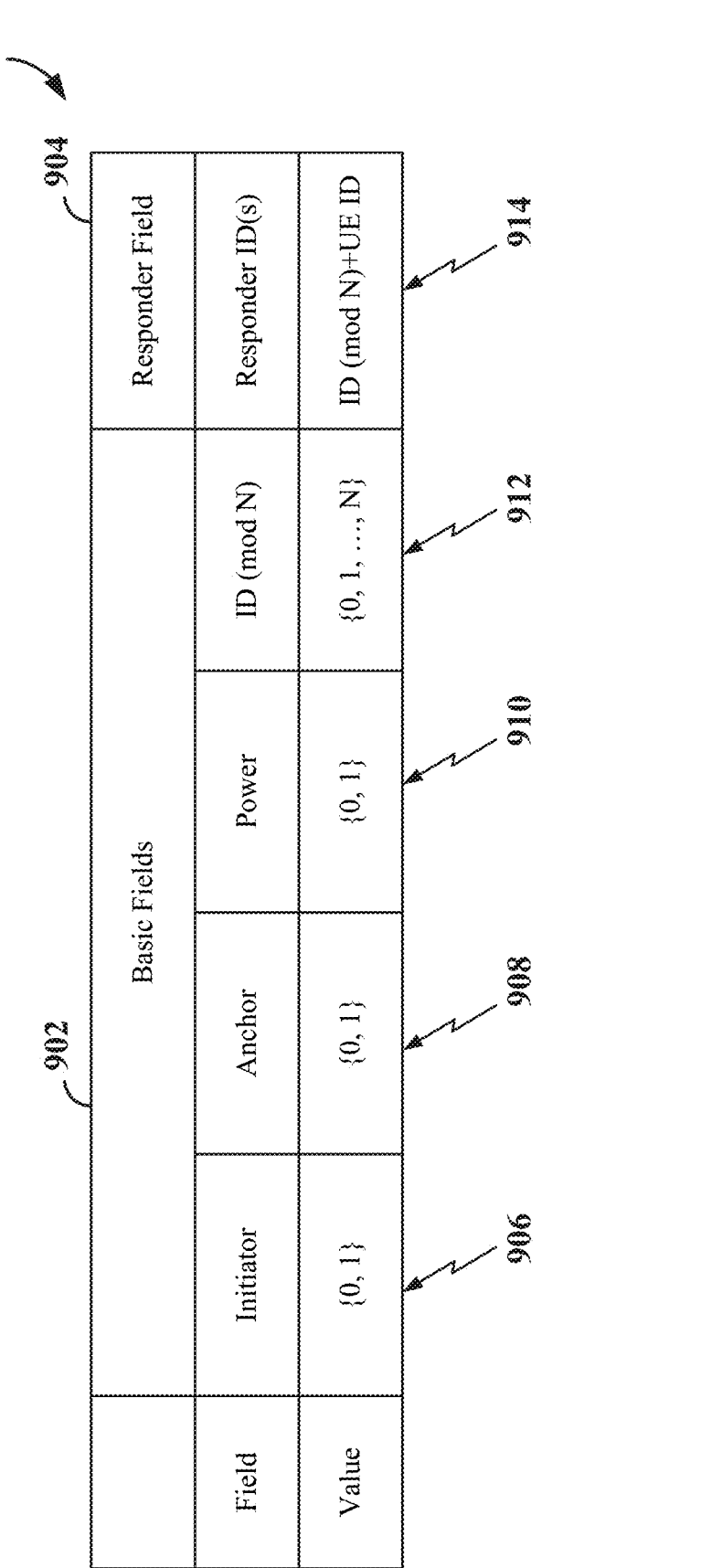
FIG. 9 is a diagram illustrating an example of a group association broadcast message transmitted by the group initiator according to some aspects.

FIG. 9 is a diagram illustrating an example of a group association broadcast message 900 that may be transmitted by the group initiator according to some aspects. In the example shown in FIG. 9, the group association broadcast message 900 payload includes basic fields 902 and a responder ID field 904. The group association broadcast message 900 may further include a header (not shown) that may include, for example, the UE ID (e.g., MAC ID) of the initiator device. The basic fields 902 include the same fields as shown in FIG. 7 and carry the device information of the transmitting device (e.g., initiator device transmitting the group association message 900). For example, the basic fields 902 include an initiator field 906 carrying initiator information, an anchor field 908 carrying anchor information, a power field 910 carrying power information, and a group ID field 912 carrying a group ID for the transmitting device, as discussed above in connection with FIG. 7.

The responder ID field 904 includes a list of responder IDs 914 identifying the members (e.g., responder devices) of the positioning group and the order of the responder devices in the positioning group. In some examples, the responder IDs 914 may be UE IDs or respective group IDs for each of the responder devices. In other examples, the responder IDs 914 may each include a concatenation of the respective responder group ID and the respective responder UE ID of each responder device in the positioning group.

The order of responder IDs 914 included in the responder ID field 904 corresponds to the order of responder devices in the positioning group (e.g., the order with which responder devices may transmit their respective PRSs). In some examples, the responder IDs 914 are listed in descending order, where the top (first) responder ID identifies the first responder device to transmit a PRS after the initiator device, the second responder ID identifies the second responder device to transmit a PRS after the first responder device, and so on.

In some examples, the order of responder IDs 914 may be determined based on the device information included in the basic fields of the responder group formation message transmitted by each of the responder devices. For example, referring now to FIG. 8, the initiator field 806 may include the most significant bit (MSB) and the group ID field 812 may include the least significant bit (LSB). In this example, referring again to FIG. 9, the order of responder IDs 914 in the responder ID field 904 may result in anchor devices being listed before non-anchor devices, and power limited devices (e.g., which may generally be non-anchor devices) being listed after non-power limited devices. By placing power limited responder devices towards the bottom of the list of responder IDs, a reduced latency between PRSs may be achieved even when a power limited device may not be awake during a particular PRS cycle.

Figure 10:
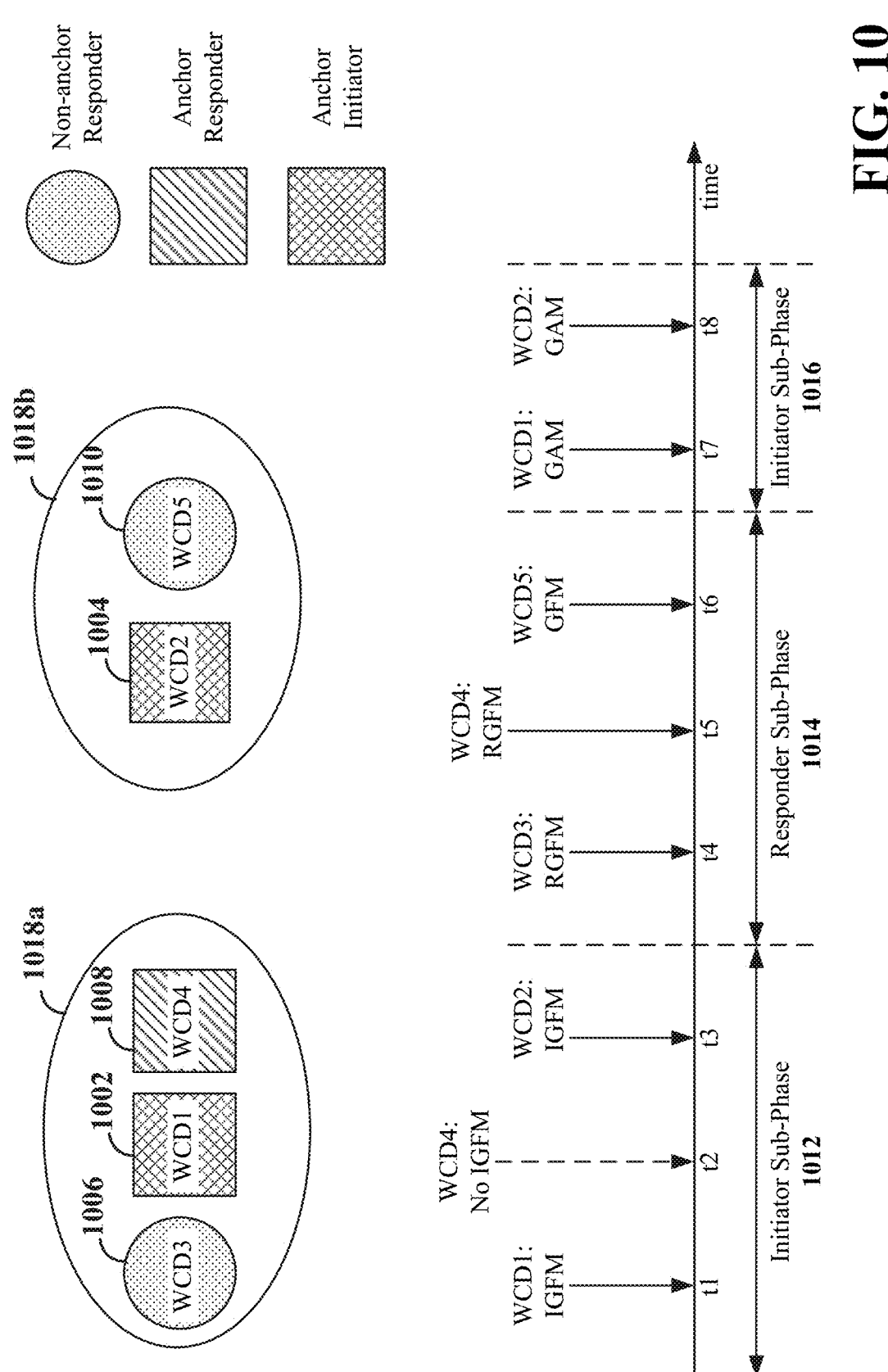
FIG. 10 is a diagram illustrating an example of positioning group formation according to some aspects.

FIG. 10 is a diagram illustrating an example of positioning group formation by a plurality of wireless communication devices (WCD1 1002, WCD2 1004, WCD3 1006, WCD4 1008, and WCD5 1010) communicating over a sidelink channel, according to some aspects. Each wireless communication device 1002, 1004, 1006, 1008, and 1010 may correspond to a sidelink device (e.g., a V2X device), such as an RSU, V-UE, P-UE, or other sidelink device. In the example shown in FIG. 10, WCD1 1002, WCD2 1004, and WCD4 1008 are anchor devices, while WCD3 1006 and WCD5 1010 are non-anchor devices.

During a first initiator sub-phase 1012 of a group phase in the time domain, one or more of the anchor devices WCD1 1002, WCD2 1004, and WCD4 1008 can broadcast (or groupcast) initiator group formation broadcast messages (IGFMs) on the sidelink channel. For example, at a first time (t1), WCD1 1002 may broadcast (or groupcast) a first initiator group formation message on the sidelink channel to form a positioning group 1018a including WCD1 1002. The first initiator group formation broadcast message may be received by each of the other wireless communication devices 1004, 1006, 1008, and 1010. Each receiving wireless communication device 1004, 1006, 1008, and 1010 may then determine whether to join the WCD1 positioning group 1018a based on the first initiator group formation message.

For example, WCD4 1008 may receive the first initiator group formation broadcast message broadcast or groupcast from WCD1 1002 and measure a received power (e.g., RSRP) at WCD4 1008 of the first initiator group formation message to determine whether to join the WCD1 positioning group 1018a. In some examples, the WCD4 1008 may compare the received power of the first initiator group formation message to a threshold (e.g., a threshold power) to determine whether to join the WCD1 positioning group

1018a. In an example, if the received power of the first initiator group formation message is less than the threshold, thus indicating that the WCD1 1002 is located distant from WCD4 1008, the WCD4 1008 may decide to not join the WCD1 positioning group 1018a. However, if the received power of the first initiator group message is greater than or equal to the threshold, thus indicating that the WCD1 1002 is proximate to WCD4 1008, as shown in the example of FIG. 10, the WCD4 1008 may decide to join the WCD1 positioning group 1018a. Therefore, at a second time (t2), the WCD4 1008 may not transmit an initiator group formation message.

As another example, WCD2 1004 may also receive the first initiator group formation broadcast message broadcast (or groupcast) from WCD1 1002 and measure the received power at WCD2 1004 of the first initiator group formation message. If the received power, as measured at WCD2 1004, is greater than or equal to a threshold (e.g., which may be the same or different than the threshold used by WCD4 1008), the WCD2 1004 may decide to join the WCD1 positioning group 1018a. However, if the received power of the first initiator group message is less than to the threshold, as shown in the example of FIG. 10, the WCD2 1004 may decide to not join the WCD1 positioning group 1018a. Therefore, at a third time (t3), the WCD2 1004 may broadcast a second initiator group formation message on the sidelink channel to form a second positioning group 1018b including the WCD2 1004.

During a responder sub-phase 1014 of the group phase, responder devices can broadcast respective responder group formation messages (RGFMs) to join one of the positioning groups 1018a and 1018b. Here, the responder devices include the anchor device WCD4 1008 and non-anchor devices WCD3 1006 and WCD5 1010. Each responder device WCD3 1006, WCD4 1008, and WCD5 1010 may receive each of the first initiator group formation message broadcast by WCD1 1002 and the second initiator group formation message broadcast by WCD2 1004 and determine whether to join the WCD1 positioning group 1018a or the WCD2 positioning group 1018b based on the received initiator group formation messages.

For example, WCD3 1006 may receive the first initiator group formation broadcast message broadcast by WCD1 1002 and the second initiator group formation broadcast message broadcast by WCD2 1004. The WCD3 1006 may further measure a received power (e.g., RSRP) of each of the first and second initiator group formation broadcast messages and compare the received power of each of the first and second initiator group formation broadcast messages to select one of the positioning groups 1018a or 1018b based on a higher received power, as measured at the WCD3 1006, of the first or second initiator group formation broadcast messages. In the example shown in FIG. 10, the received power of the first initiator group formation broadcast message broadcast (or groupcast) by WCD1 1002, as measured by WCD3 1006, is higher than the received power of the second initiator group formation broadcast message broadcast (or groupcast) by WCD2 1004. As such, at a fourth time (t4), WCD3 1006 may broadcast (or groupcast) a first responder group formation message to join the WCD1 positioning group 1018a. The first responder group formation broadcast message may include the initiator ID of the initiator device WCD1 1002 and the device information (e.g., basic fields 802 shown in FIG. 8) of the WCD3 1006.

Anchor responder device WCD4 1008 opted to not transmit an initiator group formation broadcast message during the initiator sub-phase 1012 based on a high RSRP (e.g., greater than or equal to a threshold), as measured by the WCD4 1008, of the first initiator group formation message broadcast by WCD1 1002 at the first time (t1). Therefore, during the responder sub-phase 1014, at a fifth time (t5), WCD4 1008 may broadcast (or groupcast) a second responder group formation broadcast message to join the WCD1 positioning group 1018a. The second responder group formation broadcast message may include the initiator ID of the initiator device WCD1 1002, the responder ID of WCD3 1006 that previously broadcast (or groupcast) a responder group formation broadcast message to join the WCD1 positioning group 1018, and the device information (e.g., basic fields 802 shown in FIG. 8) of the WCD4 1008.

Non-anchor responder device WCD5 1010 may also receive the first initiator group formation broadcast message sent by WCD1 1002 and the second initiator group formation broadcast message sent by WCD2 1004. The WCD5 1010 may further measure a received power (e.g., RSRP) of each of the first and second initiator group formation broadcast messages and compare the received power of each of the first and second initiator group formation broadcast messages to select one of the positioning groups 1018a or 1018b based on a higher received power, as measured at the WCD5 1010, of the first or second initiator group formation messages.

In addition, WCD5 1010 may also receive each of the responder group formation broadcast messages previously broadcast by WCD3 1006 and WCD4 1008 in the responder sub-phase 1014 and determine the positioning group 1018a and 1018b selected by each of the responder devices WCD3 1006 and WCD4 1008. The WCD5 1010 may further determine the number of responder devices that have joined each of the positioning groups 1018a and 1018b based on the received responder group formation broadcast messages. In addition, the WCD5 1010 may determine whether either of the positioning groups 1018a and 1018b has reached a maximum number of members. For example, the maximum number of positioning group members may be pre-configured for all positioning groups or may be included in the initiator group formation message broadcast by the initiator device. If, for example, positioning group 1018a has reached the maximum number of members, the WCD5 1010 may select the other positioning group 1018b. In examples in which more than two positioning groups are available, the WCD5 1010 may select the positioning group with the highest initiator group formation message RSRP that has not yet reached the maximum number of members.

In the example shown in FIG. 10, at a sixth time (t6), WCD5 1010 may send a third responder group formation broadcast message to join the WCD2 positioning group 1018b based on either a higher received power of the initiator group formation message broadcast by WCD2 1004 or a maximum number of members being reached for positioning group 1018a. The third responder group formation broadcast message may include the initiator ID of the initiator device WCD2 1004 and the device information (e.g., basic fields 802 shown in FIG. 8) of the WCD5 1010.

During a second initiator sub-phase 1016, the initiator devices (e.g., WCD1 1002 and WCD2 1004) for each of the positioning groups 1018a and 1018b can send a respective group association broadcast message that identifies the members of each positioning group and specifies a respective order of the members in that positioning group. For example, at a seventh time (t7), WCD1 1002 may send a first group association broadcast message including the initiator ID of WCD1 1002 and the responder IDs of WCD3 1006 and WCD4 1008 listed in an order for transmitting respective PRSs. In addition, at an eighth time (t8), WCD2 1004 may send a second group association broadcast message including the initiator ID of WCD2 1004 and the responder ID of WCD5 1010.

Figure 11:
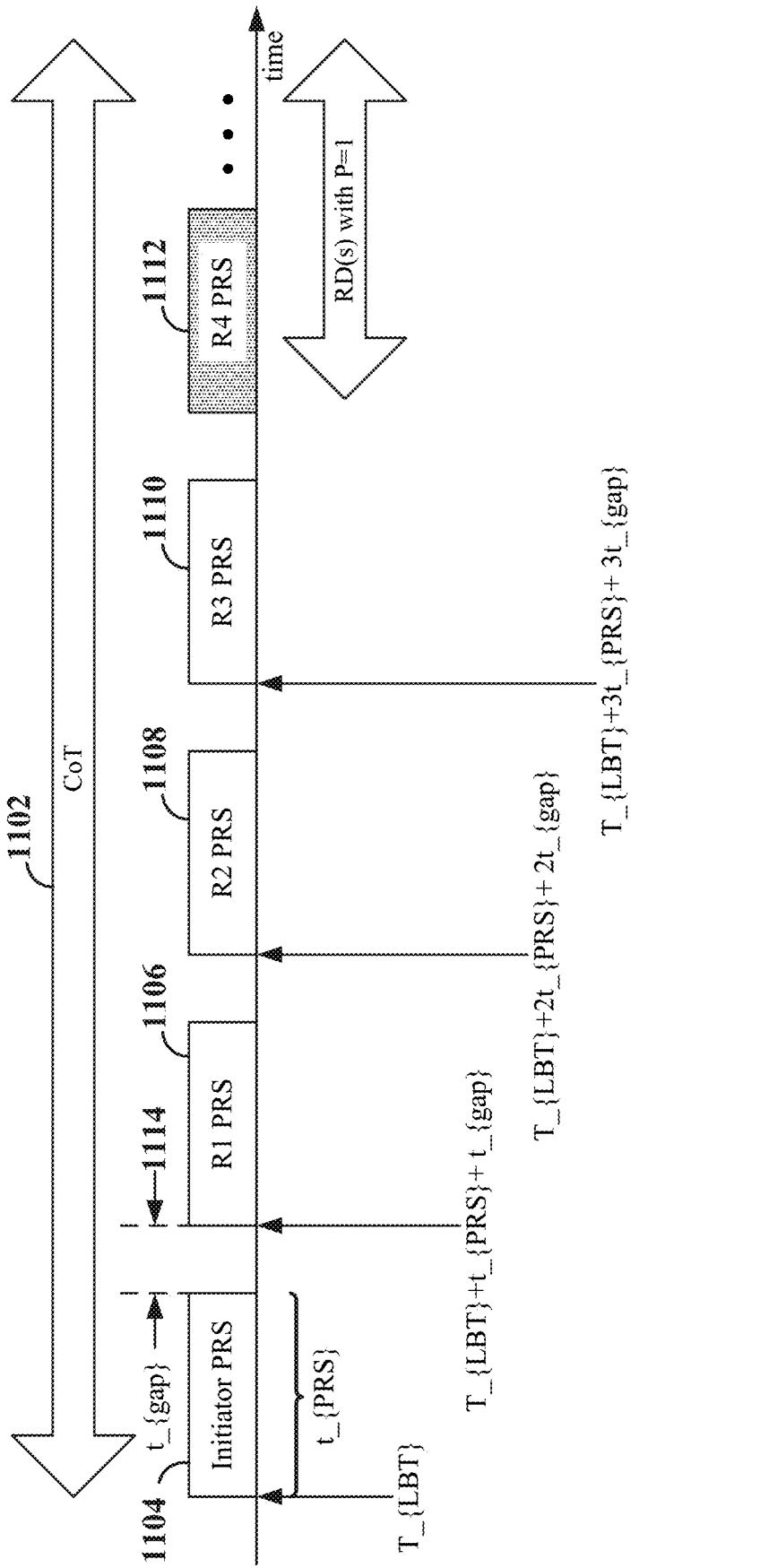
FIG. 11 is a diagram illustrating an example of group-based PRS broadcast according to some aspects.

FIG. 11 is a diagram illustrating an example of group-based PRS broadcast according to some aspects. The group-based PRS broadcast example shown in FIG. 11 may be performed, for example, during a PRS cycle within the PRS phase in the time domain. As shown in FIG. 11, an initiator device of the positioning group may reserve the sidelink channel for a CoT 1102 sufficient for the transmission of PRSs by each of the members of the positioning group. In some examples, the initiator device may implement Cat 4 LBT to reserve the CoT 1102 for all positioning group members and transmit a first PRS (e.g., an initiator PRS 1104) at a time T_{LBT}. Thereafter, the responder devices in the positioning group may implement Cat 2 LBT to broadcast their PRSs 1106, 1108, 1110, and 1112. Each PRS 1104-1112 may include a respective PRS sequence. For example, each PRS sequence may be a wideband random sequence that is broadcast over an unlicensed frequency band. In some examples, each PRS may further include a sequence identifier (ID) identifying the PRS sequence. Each broadcast described herein may instead be groupcast, as discussed.

Each responder device may determine the respective transmission timing of its PRS within the CoT 1102 from the group association message indicating the order of responder devices within the positioning group. For example, each PRS 1104-1112 may have a same (e.g., set) duration denoted as t_{PRS}. In addition, each responder device may provide a respective gap 1114, denoted as t_{gap}, between the end of the previously transmitted PRS and the responder device PRS. In some examples, the gap 1114 may be 25 µs. Upon determining that a first responder device (R1) is listed first in the order of responder devices within the group association message, the first responder device (R1) may transmit a second PRS (R1 PRS) 1106 at a time T_{LBT}+t_{PRS}+ t_{gap}. Similarly, a second responder device (R2) may transmit a third PRS (R2 PRS) at a time T_{LBT}+ 2t_{PRS}+2t_{gap}. Furthermore, a third responder device (R3) may transmit a fourth PRS (R3 PRS) 1108 at a time T_{LBT}+3t_{PRS}+3t_{gap}. In general, the k-th wireless communication device PRS broadcast time may be determined as: T_{LBT}+(k−1)t_{PRS}+(k−1)t_{gap}. By providing a fixed gap 1114 between the PRSs and a known order of PRS transmissions, the latency between PRSs may be reduced, thus improving the efficiency and accuracy of sidelink positioning.

Other responder devices (e.g., responder device R4) may transmit their respective PRSs (e.g., R4 PRS 1112) at respective transmission times similarly determined based on the order listed in the group association message. In some examples, responder devices (RDs) that are power limited (e.g., P=1 in the device information shown in FIG. 8) may be placed at the end of the responder list (e.g., at the bottom of the order). Such power limited responder devices (e.g., responder device R4) may have a lower duty cycle than a non-power limited responder device (e.g. a responder device with P=0), and as such may not transmit a PRS each PRS cycle, as indicated by the shading of R4 PRS 1112. For example, a power limited responder device may transmit a PRS (and corresponding PRS measurement message) every 500 ms or 1000 ms, whereas a non-power limited responder device may transmit a PRS every 100 ms within the PRS phase. By placing the power limited responder devices at the end of the list, the latency between consecutive PRSs 1104-1112 may be reduced during each PRS cycle.

Figure 12:
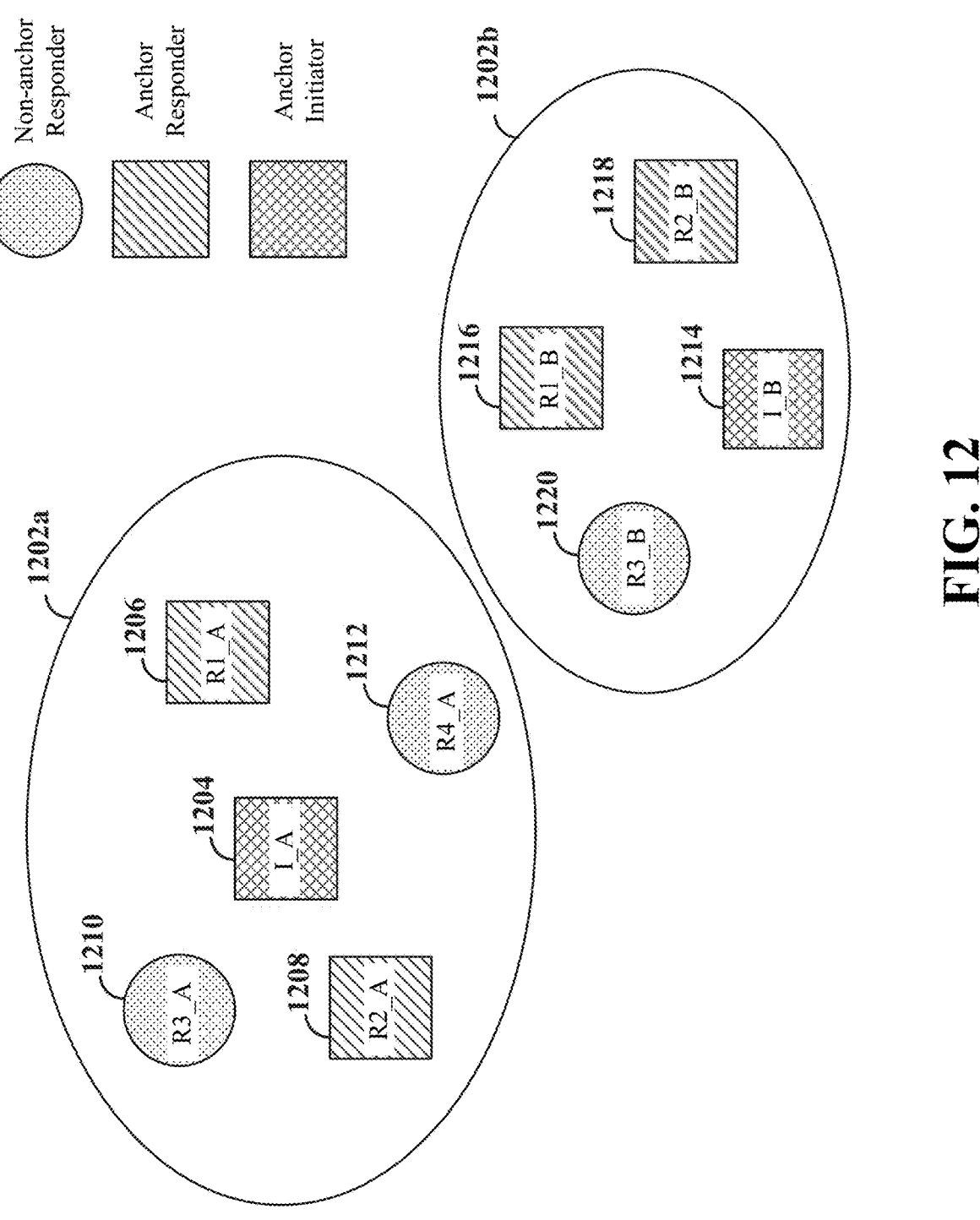
FIG. 12 illustrates an example of an arrangement of devices belonging to two PRS broadcast positioning groups, in a scenario suitable for opportunistic CoT sharing.

FIG. 12 illustrates an example of an arrangement of devices belonging to two PRS broadcast positioning groups, in a scenario suitable for opportunistic CoT sharing. Here, two positioning groups 1202*a* and 1202*b* are shown, but opportunistic CoT sharing can be established between more than two positioning groups in a similar manner. The positioning group 1202*a* includes an anchor initiator device (denoted I_A) 1204, two anchor responder devices (denoted R1_A and R2_A) 1206 and 1208, and two non-anchor responder devices (denoted R3_A and R4_A) 1210 and 1212. The positioning group 1202*b* includes an anchor initiator device (denoted I_B) 1214, two anchor responder devices (denoted R1_B and R2_B) 1216 and 1218, and a non-anchor responder device (denoted R3_B) 1220. Each broadcast described herein may instead be groupcast, as discussed.

The two positioning groups 1202*a* and 1202*b* may be formed using messages such as initiator group formation messages (IGFMs), responder group formation messages (RGFMs), and group association messages (GAMs), as discussed previously. Normally, once the two positioning groups 1202*a* and 1202*b* are formed, the initiator device of each positioning group may independently implement Cat 4 LBT to reserve a CoT for all the positioning reference signals (PRSs) of its group members. Thus, initiator device 1204 (I_A) may independently implement Cat 4 LBT to reserve a CoT for responder devices 1206-1212 (R1_A through R5_A). Initiator device 1214 (I_B) may independently implement Cat 4 LBT to reserve a different CoT for responder devices 1216-1220 (R1_B through R3_B).

Intra-group PRS signaling to establish RTTs for positioning generally works well. PRS signal latency is well-managed within each positioning group. Once a CoT is established by the initiator device using Cat 4 LBT, each PRS signal may be broadcast from a different member (i.e., the initiator device, followed by each responder device) of the positioning group in succession, in a well-controlled and predictable fashion. To broadcast its PRS signal, each responder device of the positioning group may only perform a Cat 2 LBT, which involves a simple clear channel assessment (CCA), without the need to perform a contention channel "back-off," (as in the case of Cat 4 LBT). Thus, within the positioning group, all the group members can broadcast their PRS signals in order, all within a relatively tight and well-controlled time frame—i.e., within the CoT. For example, responder device 1206 (R1_A) and responder device 1210 (R3_A) would broadcast their PRS signals within the same CoT. Thus, the RTT measurement between these two devices would involve relatively low PRS latency.

By contrast, inter-group PRS signaling to establish RTTs across members of different positioning groups may suffer from markedly longer and less predictable PRS latency, which can lead to significant degradation of the RTT measurement. For example, responder device 1212 (R4_A) from positioning group 1202*a* and responder device 1216 (R1_B) from positioning group 1202*b* normally would not broadcast their PRS signals within the same CoT. The responder device 1212 (R4_A) would broadcast its PRS signal within the CoT established by initiator device 1204 (I_A). The responder device 1216 (R1_B) would broadcast its PRS signal within a different CoT, established by the initiator device 1214 (I_B). The two CoTs would be independently established, each with its own back-off. Thus, there can be a significant latency between the PRS signal broadcast of the responder device 1212 (R4_A) from positioning group 1202*a* and the PRS signal broadcast of the responder device 1216 (R1_B) from positioning group 1202*b*. Such PRS signal latency can negatively impact the accuracy of the RTT measurement performed for ranging between the responder device 1212 (R4_A) and the responder device 1216 (R1_B).

Yet, inter-group PRS signaling may be useful and appropriate in certain scenarios. For example, if the accuracy of a particular multilateration operation may significantly improve by including an RTT measurement with an anchor at or near a particular geographic location, and the only available PRS-capable device near that geographic location is a device belonging to a different positioning group, inter-group PRS signaling may be warranted. A request for inter-group PRS may be triggered in a number of different ways, as discussed below.

One category of such requests may be referred to as "sensor-based" requests. One type of sensor-based trigger may be based on the frequency of receiving PRS signals from another positioning group. For example, if positioning groups are formed each time as a result of 10 PRS signal exchanges, and the responder device 1220 (R3_B) from positioning group 1202*b* receives PRSs from devices in positioning group 1202*a* more than X times (e.g., X=5), then the responder device 1220 (R3_B) may request inter-group PRS signaling with the positioning group 1202*a*. Another type of sensor-based trigger may be based on the received power of PRS signals from another positioning group. For example, if the responder device 1220 (R3_B) from positioning group 1202*b* receives PRSs from devices in positioning group 1202*a*, and the associated reference signal receive power (RSRP) measurements exceed a certain threshold (e.g., in the aggregate, or in some other fashion), then the responder device 1220 (R3_B) may request inter-group PRS signaling with the positioning group 1202*a*. Another category of inter-group PRS signal requests may be referred to as "core network" based requests. Here a central entity such as a core network (CN) within a cellular communications system supporting data communications with the various sidelink devices, including devices 1204-1220, may maintain the positioning groups 1202*a* and 1202*b*. In such a scenario, the core network may determine and indicate a need for inter-group PRS signaling between positioning groups 1202*a* and 1202*b*.

The initiator device of a positioning group may receive a request for inter-group PRS signaling (either from one of its responder devices or from the CN) and respond by attempting to establish opportunistic CoT sharing between positioning groups. The initiator device may do so by coordinating with the initiator device of the other positioning group. Such initiator-to-initiator coordination may occur over a separate channel, such as a dedicated channel over the ITS band. For example, the initiator device 1216 (I_B) of the positioning group 1202*b*, upon receiving an inter-group PRS signaling request from the responder device 1220 (R3_B), may coordinate with the initiator device 1204 (I_A) of the positioning group 1202*a*. Alternatively, an initiator device may attempt to independently establish opportunistic CoT sharing, without coordination with the other initiator device. For example, the initiator device 1216 (I_B) of the positioning group 1202*b*, upon receiving an inter-group PRS signaling request from the responder device 1220 (R3_B), may attempt to share the CoT established for the positioning group 1202*a*, without coordinating with the initiator device 1204 (I_A).

Figure 13:
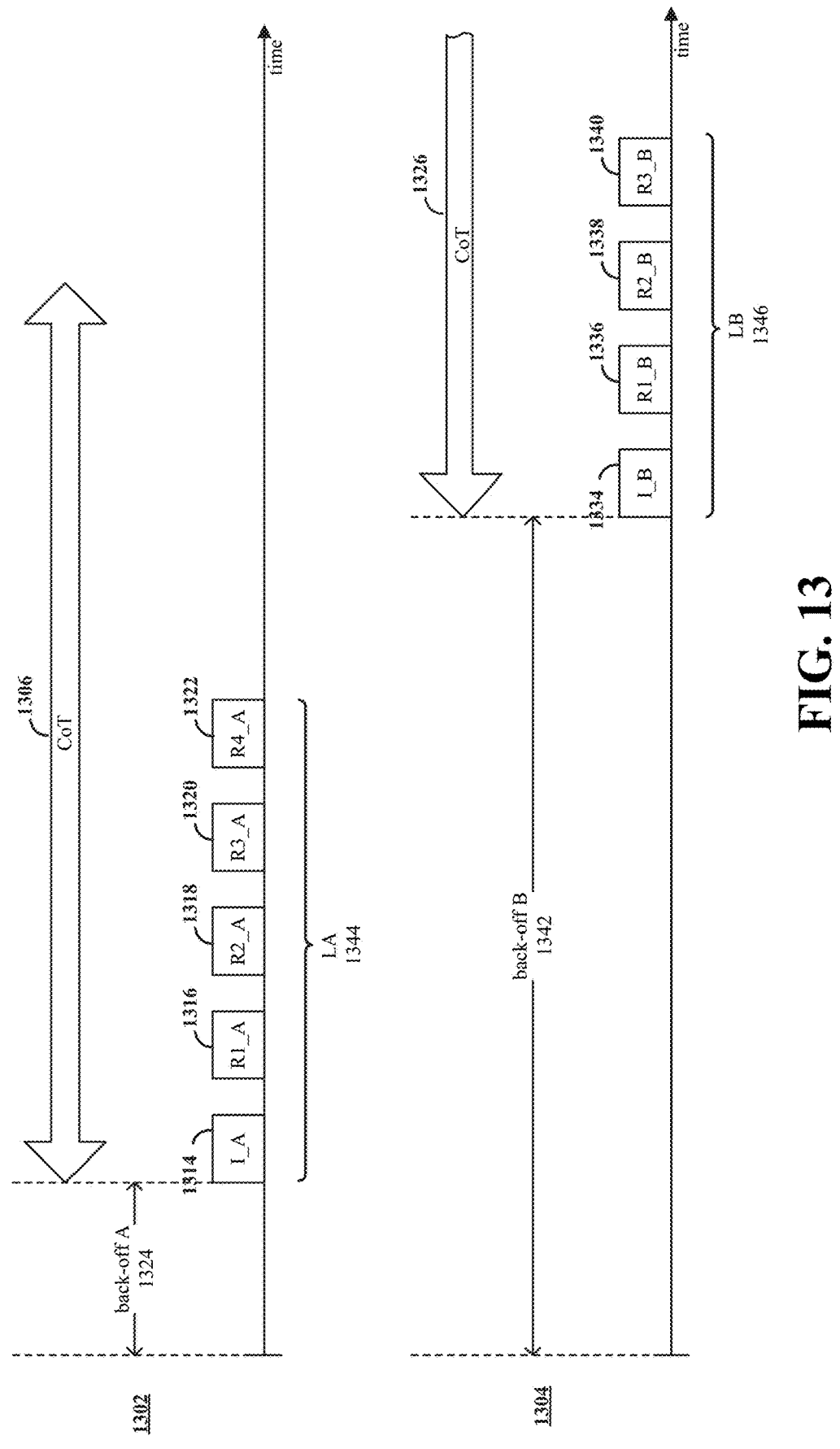
FIG. 13 is a timing diagram illustrating an example of an opportunity for CoT sharing between two PRS broadcast positioning groups.

FIG. 13 is a timing diagram illustrating an example of an opportunity for CoT sharing between two PRS broadcast positioning groups. CoT sharing between more than two groups may be performed in a similar manner. However, only two groups are shown for ease of illustration. As discussed, opportunistic CoT sharing may occur with or without coordination between the initiators of respective positioning groups. Each broadcast described herein may instead be groupcast, as discussed.

Referring to FIG. 13, two PRS broadcast sequences 1302 and 1304 are shown. The first PRS broadcast sequence 1302 occurs within a CoT 1306. The first PRS broadcast sequence 1302 comprises a sequence of PRS broadcasts, including an initiator PRS 1314 and four responder PRSs 1316, 1318, 1320, and 1322, which are broadcast from the initiator device 1204 and four responder devices 1206, 1208, 1210, and 1212, respectively (from the positioning group 1202*a*, shown in FIG. 12). The initiator device 1204 may establish the CoT 1306 by performing Cat 4 LBT, which may set the start time of the CoT 1306 based on a back-off time ("back-off A") 1324. The second PRS broadcast sequence 1304 occurs within a CoT 1326. The second PRS broadcast sequence 1304 comprises a sequence of PRS broadcasts, including an initiator PRS 1334 and four responder PRSs 1336, 1338, and 1340, which are broadcast from the initiator device 1214 and three responder devices 1216, 1218, and 1220, respectively (from the positioning group 1202*b*, shown in FIG. 12). The initiator device 1214 may establish the CoT 1326 by performing Cat 4 LBT, which may set the start time of the CoT 1326 based on a back-off time ("back-off B") 1342.

If the initiator devices 1202 and the initiator device 1204 coordinate to establish CoT sharing, they may each perform Cat 4 LBT using a back-off counter initialized to a random number selected from an interval proportional to the sum of (1) the number of devices in its positioning group and (2) the number of devices in the other positioning group. Here, the sum of the number of devices from both groups is 5+4=9. Thus, the initiator devices 1202 and the initiator device 1204 each generates a random number, using a random number generator characterized by a uniform probability distribution function over an interval [0, 9], in order to determine their respective back-off time. As shown in FIG. 13, the initiator devices 1202 thus generates a back-off time 1324. The initiator device 1204 thus generates a back-off time 1342.

If the initiator devices 1202 and the initiator device 1204 do not coordinate to establish CoT sharing, they may each perform Cat 4 LBT using a back-off counter initialized to a random number selected from an interval proportional to the number of devices in its own positioning group. Thus, the initiator device 1202 would generate the back-off time 1324 using a random number generator characterized by a uniform probability distribution function over an interval [0, 5], because there are 5 devices in the positioning group 1202*a*. The initiator device 1204 would generate the back-off time 1326 using a random number generator characterized by a uniform probability distribution function over an interval [0, 4], because there are 4 devices in the positioning group 1202*b*.

Regardless of whether the initiator devices 1202 and 1204 coordinate to established CoT sharing, the initiator device 1204 may attempt to "fit" the PRSs associated with the positioning group 1202*b* into the CoT 1306, which was scheduled for the PRSs associated with the positioning group 1202*a*. Because all group messages, including all group formation messages (IGFMs), responder group formation messages (RGFMs), and group association messages (GAMs), are heard by all devices, the initiator device 1204 is aware of the membership, order, etc. of the positioning group 1202*a*. Thus, the positioning group 1202*b* is able to determine the total PRS sequence duration 1344 of the PRSs of the positioning group 1202*a*. The duration of the CoT 1306 is also typically known. The initiator device 1204 may thus determine whether there is sufficient room in the CoT 1306, to fit the PRSs for the positioning group 1202*b*. For instance, if the remaining time in the CoT 1306 is greater than the duration 1346 of the PRSs of the positioning group 1206*b*, the initiator device 1204 may proceed with an attempt to have the PRSs of the positioning group 1202*b* be broadcast in the CoT 1306.

As mentioned previously, while positioning reference signals (PRSs) are used as examples to illustrate various aspects, different types of reference signals, such as sounding reference signals (SRSs) or other types of signals, may be used instead.

Figure 14:
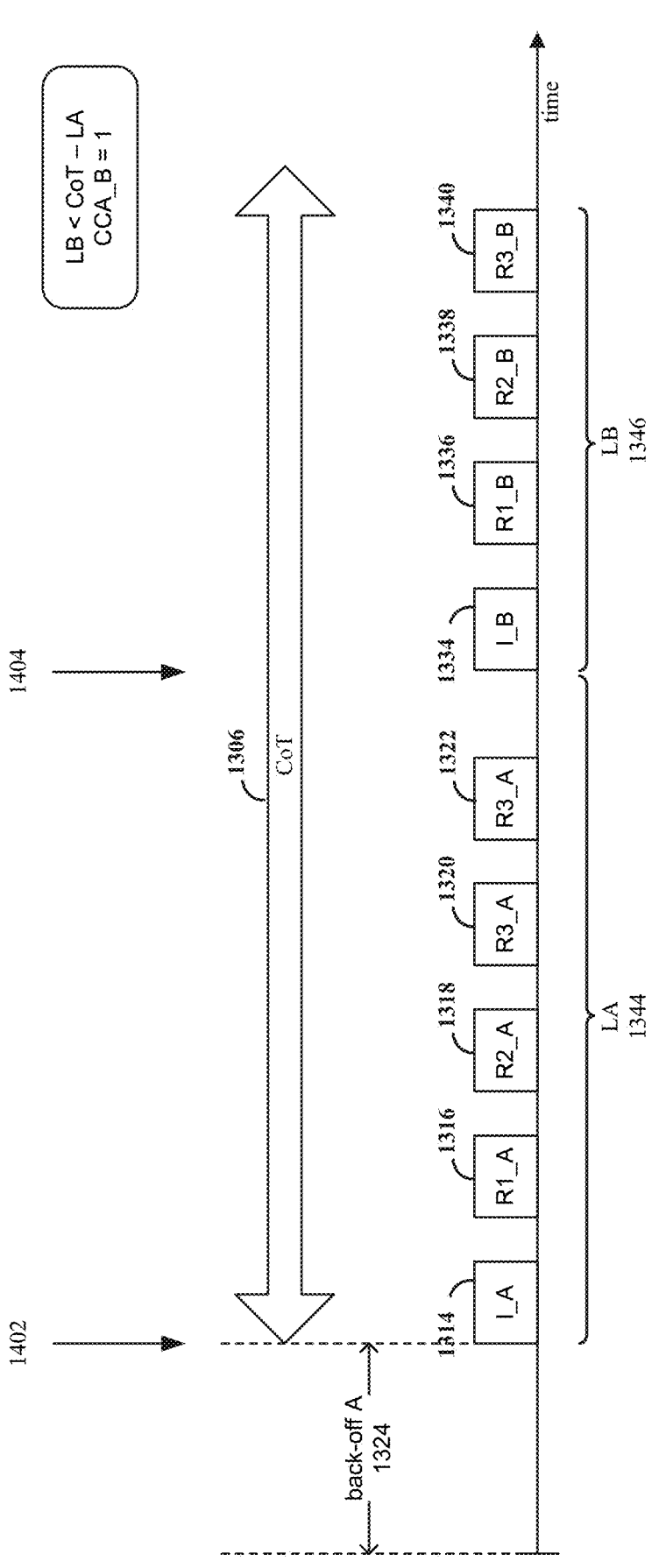
FIG. 14 illustrates a successful attempt to opportunistically share a CoT.

FIG. 14 illustrates a successful attempt to opportunistically share a CoT, according to an embodiment. As discussed in the context of FIG. 13, the initiator device 1202 and the initiator device 1204 may each plan to perform Cat 4 LBT and schedule respective CoTs. In doing so, each of the initiator device 1202 and the initiator device 1204 may set a back-off using a randomly selected number. The first initiator device that finishes counting down its back-off time and successfully completes a clear channel assessment (CCA) proceeds to establish a CoT to have its positioning group broadcast PRS signals. In this case, the initiator device 1202 is first to finish counting down its back-off time 1324 and successfully complete a CCA, at time 1402. As such, the initiator device 1202 establishes the CoT 1306 and broadcasts its PRS 1314, and its responder devices broadcast PRSs 1316, 1318, 1320, and 1322, respectively. Each broadcast described herein may instead be groupcast, as discussed.

In response, the initiator device 1304 evaluates two conditions. First, the initiator device 1304 determines whether the CoT 1306 has sufficient room, after the PRSs 1314, 1316, 1318, 1320, and 1322, to fit the PRSs for the positioning group 1202*b*, namely PRSs 1334, 1336, 1338, and 1340. In the present example, there is sufficient room. In other words, the duration LB 1346 is less than the CoT 1306 minus the duration LA 1344 (LB<CoT-LB). Second, the initiator device 1304 performs Cat 2 LBT at a time 1404, at the end of PRSs of the positioning group 1202*a*. The Cat 2 LBT comprises a clear channel assessment (CCA). Here, the CCA completes successfully (CCA_B=1). Having met both conditions, the initiator device 1304 proceeds to broadcast its PRS 1334. The responders of the initiator device 1304 also broadcast their respective PRSs 1336, 1338, and 1340. In this manner, the initiator device 1304 may avoid a planned Cat 4 LBT to establish its own CoT. Instead, the initiator device 1304 successfully shares the CoT 1306 established by the initiator 1302, in an opportunistic fashion.

Figure 15:
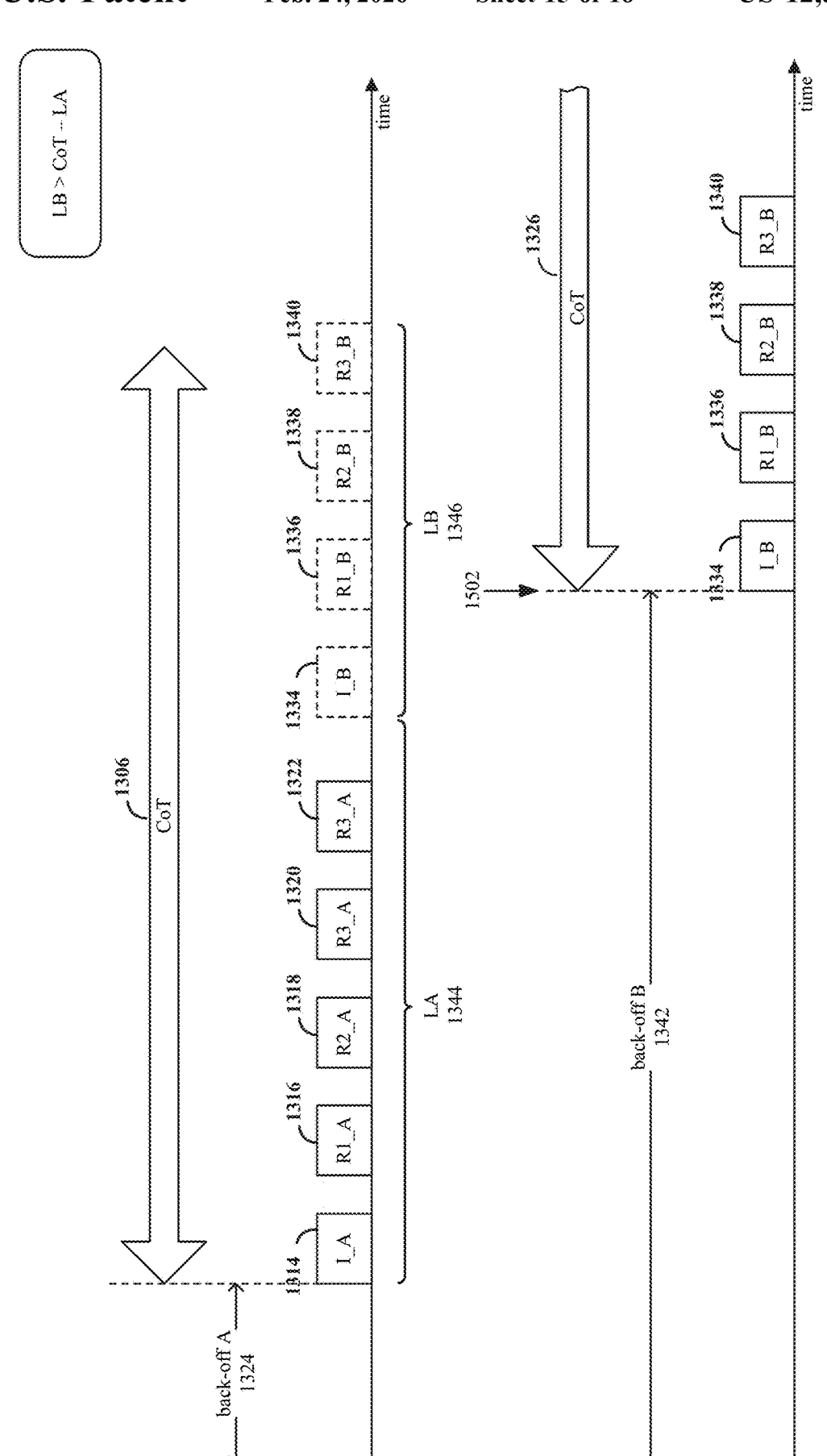
FIG. 15 illustrates an unsuccessful attempt to opportunistically share a CoT as result of insufficient transmission time.

FIG. 15 illustrates an unsuccessful attempt to opportunistically share a CoT as result of insufficient transmission time, according to an embodiment. Similar to the scenario in FIG. 14, the initiator device 1202 is first to finish counting down its back-off time 1324 and successfully complete a CCA. As such, the initiator device 1202 establishes the CoT 1306 and broadcasts its PRS 1314, and its responder devices broadcast PRSs 1316, 1318, 1320, and 1322, respectively. In response, the initiator device 1304 evaluates the same two conditions discussed previously. Here, the initiator device 1304 determines that the CoT 1306 has insufficient room, after the PRSs 1314, 1316, 1318, 1320, and 1322, to fit the PRSs for the positioning group 1202*b*. In other words, the duration LB 1346 is greater than the CoT 1306 minus the duration LA 1344 (LB>CoT-LB). Having determined that opportunistic sharing of the CoT 1306 is not possible, the initiator device 1304 retrieves the back-off time 1342 it previously generated. The initiator device 1304 uses the back-off time 1342 to perform Cat 4 LBT at a time 1502, in order to establish its own CoT 1326, as originally planned. The initiator device 1304 then proceeds to broadcast its PRS 1334, and the responders of the initiator device 1304 also broadcast their respective PRSs 1336, 1338, and 1340, within the CoT 1326. Each broadcast described herein may instead be groupcast, as discussed.

Figure 16:
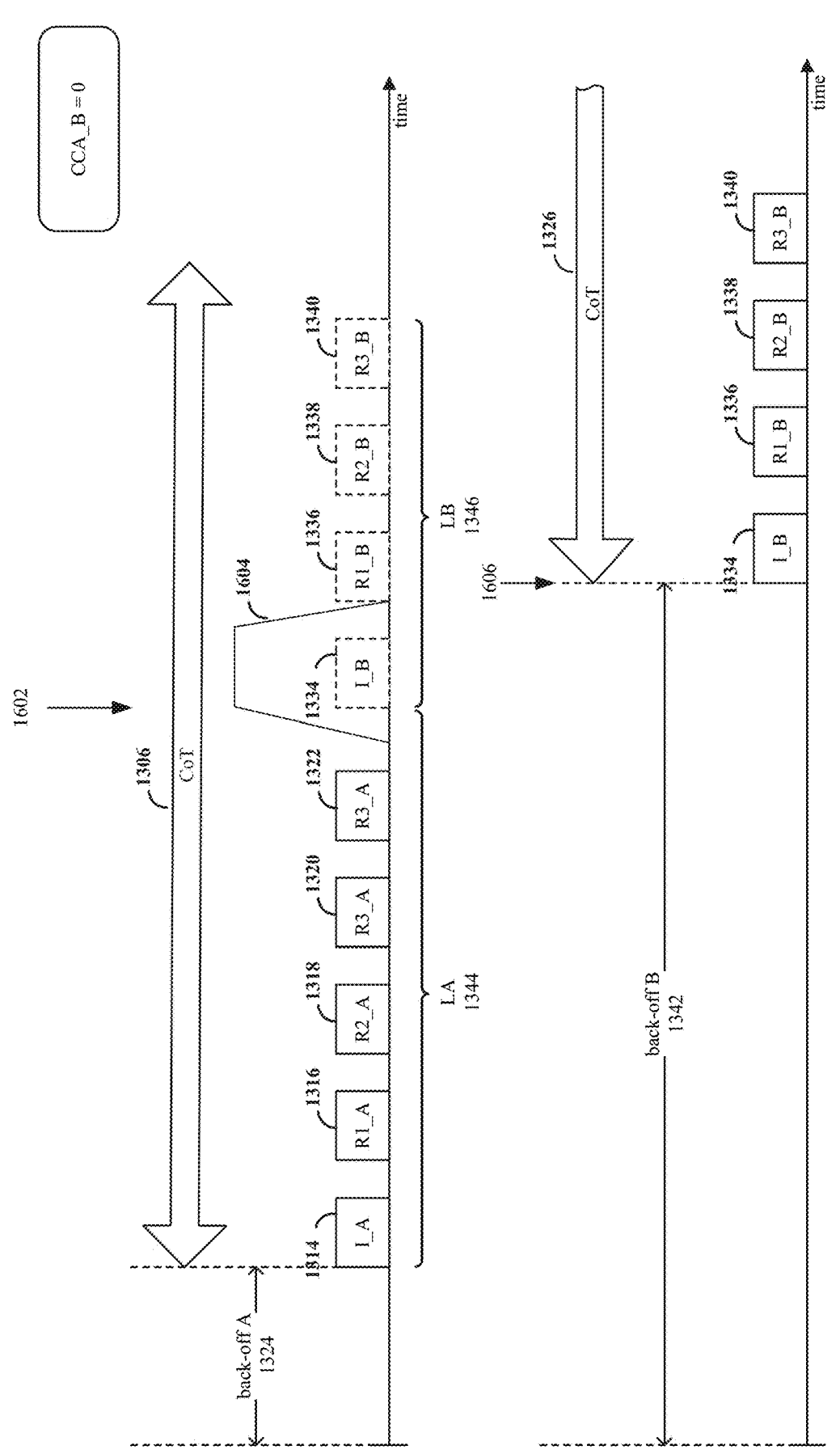
FIG. 16 illustrates an unsuccessful attempt to opportunistically share a CoT as result of a failed clear channel assessment (CCA).

FIG. 16 illustrates an unsuccessful attempt to opportunistically share a CoT as result of a failed clear channel assessment (CCA), according to an embodiment. Similar to the scenario in FIGS. 14 and 15, the initiator device 1202 is first to finish counting down its back-off time 1324 and successfully complete a CCA. As such, the initiator device 1202 establishes the CoT 1306 and broadcasts its PRS 1314, and its responder devices broadcast PRSs 1316, 1318, 1320, and 1322, respectively. In response, the initiator device 1304 evaluates the same two conditions discussed previously. Here, the initiator device 1304 determines that the CoT 1306 has sufficient room, after the PRSs 1314, 1316, 1318, 1320, and 1322, to fit the PRSs for the positioning group 1202*b*. In other words, the duration LB 1346 is less than the CoT 1306 minus the duration LA 1344 (LB<CoT-LB). Next, the initiator device 1304 performs Cat 2 LBT comprising a CCA at a time 1602, at the end of PRSs of the positioning group 1202*a*. In this case, an interferer signal 1604 is present when the CCA is performed, and the CCA fails (CCA_B=0). As a result, the attempt to share the CoT 1306 is discontinued. Once again, having determined that opportunistic sharing of the CoT 1306 will not occur, the initiator device 1304 retrieves the back-off time 1342 it previously generated. The initiator device 1304 uses the back-off time 1342 to perform Cat 4 LBT at a time 1606, in order to establish its own CoT 1326, as originally planned. The initiator device 1304 then proceeds to broadcast its PRS 1334, and the responders of the initiator device 1304 also broadcast their respective PRSs 1336, 1338, and 1340, within the CoT 1326. Each broadcast described herein may instead be groupcast, as discussed.

Figure 17:
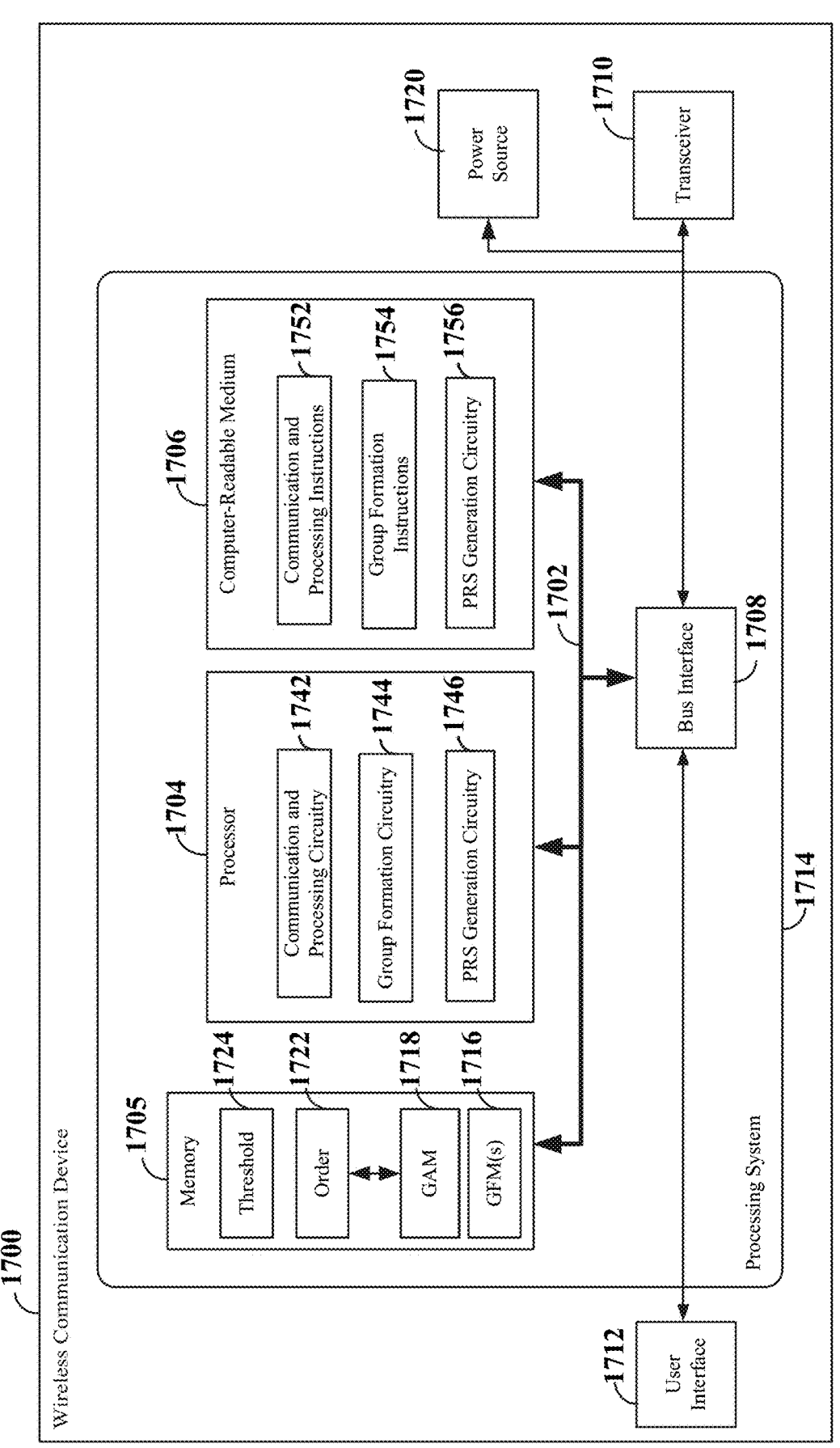
FIG. 17 is a block diagram illustrating an example of a hardware implementation for a wireless communication device 1700 employing a processing system.

FIG. 17 is a block diagram illustrating an example of a hardware implementation for a wireless communication device 1700 employing a processing system 1714. For example, the wireless communication device 1700 may correspond to a sidelink (e.g., V2X) device, such as an RSU, V-UE, P-UE, or other suitable sidelink device, as shown and described above in reference to FIG. 1-5 or 10.

The wireless communication device 1700 may be implemented with a processing system 1714 that includes one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1700 may be configured to perform any one or more of the functions described herein. That is, the processor 1704, as utilized in the wireless communication device 1700, may be used to implement any one or more of the processes and procedures described below.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 links together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further.

A bus interface 1708 provides an interface between the bus 1702 and a transceiver 1710. The transceiver 1710 provides a means for communicating with various other apparatus over a transmission medium (e.g., air interface). The bus interface 1708 further provides an interface between the bus 1702 and a power source (e.g., a battery) 1720. Depending upon the nature of the apparatus, a user interface 1712 (e.g., keypad, display, touch screen, speaker, microphone, control knobs, etc.) may also be provided. Of course, such a user interface 1712 is optional, and may be omitted in some examples.

The processor 1704 is responsible for managing the bus 1702 and general processing, including the execution of software stored on the computer-readable medium 1706. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1704, causes the processing system 1714 to perform the various functions described below for any particular apparatus. The computer-readable medium 1706 and the memory 1705 may also be used for storing data that is manipulated by the processor 1704 when executing software.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. In some examples, the computer-readable medium 1706 may be part of the memory 1705. Those skilled in the art will recognize how best to implement the described functionality presented throughout this disclosure depending on the particular application and the overall design constraints imposed on the overall system.

In some aspects of the disclosure, the processor 1704 may include circuitry configured for various functions. For example, the processor 1704 may include communication and processing circuitry 1742, configured to communicate with other wireless communication devices (e.g., RSUs, V-UEs, P-UEs, etc.) over a sidelink channel. In some examples, the communication and processing circuitry 1742 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1742 may be configured to broadcast a group formation message over the sidelink channel via the transceiver 1710. The communication and processing circuitry 1742 may further be configured to receive one or more group formation messages broadcast by other wireless communication devices via the transceiver 1710. The communication and processing circuitry 1742 may further be configured to store the received group formation messages (GFMs) 1716 in memory 1705 for further processing.

The communication and processing circuitry 1742 may further be configured to broadcast or receive, via the transceiver 1710, a group association message (GAM) 1718 indicating an order 1722 of a plurality of wireless communication devices within a positioning group including the wireless communication device 1700. The communication and processing circuitry 1742 may further be configured to broadcast a positioning reference signal (PRS) within the positioning group and to receive PRSs broadcast from other wireless communication devices within the positioning group. The communication and processing circuitry 1742 may further be configured to execute communication and processing instructions (software) 1752 stored in the computer-readable medium 1706 to implement one or more of the functions described herein.

The processor 1704 may further include group formation circuitry 1744, configured to generate a group formation message (e.g., an initiator group formation message or a responder group formation message) to be broadcast on the sidelink channel and to process group formation messages (e.g., initiator group formation messages and/or responder group formation messages) received from other wireless communication devices. In examples in which the wireless communication device 1700 is an anchor device, the group formation circuitry 1744 may be configured to determine whether an initiator group formation message has been received from another anchor initiator wireless communication device during an initiator sub-phase of a current group phase within which positioning groups may be formed.

If an initiator group formation message has been received, the group formation circuitry 1744 may measure the received power (e.g., RSRP) of the initiator group formation message and compare the received power to a threshold 1724, which may be stored, for example, in memory 1705. If the received power of the initiator group formation message is greater than the threshold 1724, the initiator group formation message 1716 may be stored in memory 1705 and utilized by the group formation circuitry 1744 to generate a responder group formation message during a responder sub-phase of the current group phase to join the positioning group initiated by the initiator group formation message. Here, the anchor device 1700 is functioning as a responder device. Otherwise, if the received power of the initiator group formation message is less than or equal to the threshold 1724, the group formation circuitry 1744 may discard the received initiator group formation message and generate a new initiator group formation message to form a new positioning group for the wireless communication device 1700. Here, the anchor device is functioning as an initiator device. If another initiator group formation message has not been received within the initiator sub-phase, the anchor device 1700 may function as an initiator device and the group formation circuitry 1744 may generate an initiator group formation message to form a positioning group for the wireless communication device 1700.

In examples in which the wireless communication device 1700 is an initiator device that broadcasts an initiator group formation message during the current initiator sub-phase to form a positioning group, the group formation circuitry 1744 may further be configured to receive one or more responder group formation messages 1716 from responder devices within the responder sub-phase of the current group phase. Each responder group formation message 1716 may include, for example, device information associated with the respective responder device, an initiator ID of the initiator device 1700 and respective responder IDs of other responder devices that previously broadcast responder group formation messages to join the positioning group of the initiator device 1700. The received responder group formation messages 1716 may be stored, for example, in memory 1705 for further processing. For example, the group formation circuitry 1744 may further be configured to utilize the received responder group formation messages 1716 to determine an order 1722 of the responder devices to transmit respective PRSs within a PRS phase subsequent in time to the current group phase. The order 1722 may be based on, for example, the device information associated with each responder device. In some examples, the order 1722 may include a list of responder devices in descending order, such that the first listed responder device should broadcast a PRS after the initiator device, the second listed responder device should broadcast a PRS after the first listed responder device, and so on. The group formation circuitry 1744 may further be configured to generate a group association message (GAM) 1718 for the positioning group. The GAM 1718 may include, for example, an initiator ID of the initiator device 1700 and the order 1722 of the responder devices. The GAM 1718 may be broadcast within a second initiator sub-phase of the current group phase.

In examples in which the wireless communication device 1700 is a non-anchor device, the non-anchor device 1700 may determine whether an initiator group formation message has been received from an initiator device during the initiator sub-phase of the current group phase. If an initiator group formation message has not yet been received, the group formation circuitry 1744 may function as an initiator device to generate an initiator group formation message and broadcast the initiator group formation message during the responder sub-phase of the current group phase to form a positioning group for the non-anchor device 1700.

If one or more initiator group formation messages 1716 have been received, the non-anchor device 1700 may function as a responder device to select a positioning group to join based on the received initiator group formation messages 1716. The received initiator group formation messages may be stored, for example, in memory 1705 until a positioning group is selected for the non-anchor device. For example, the group formation circuitry 1744 may measure the received power (e.g., RSRP) of each initiator group formation message 1716 and select the positioning group associated with the initiator group formation message 1716 having the highest received power.

As another example, the group formation circuitry 1744 may determine a number of members of each of the positioning groups associated with the received initiator group formation messages 1716. The number of members of a particular positioning group may be determined, for example, based on responder group formation messages 1716 received for that particular positioning group during the responder sub-phase of the current group phase. For example, the group formation circuitry 1744 may be configured to count the number of responder group formation messages 1716 received for each positioning group. If the number of members of a positioning group has reached a maximum number of members, the group formation circuitry 1744 may not select that positioning group. Instead, the group formation circuitry 1744 may select another positioning group for which the number of members has not reached the maximum number of members. Here, the maximum number of members for a positioning group may be pre-determined and stored, for example, in memory 1705 or included in the initiator group formation message. In some examples, the group formation circuitry 1744 may further select a positioning group from the remaining positioning groups that have a number of members less than the maximum number of members based on the received power of the corresponding initiator group formation messages 1716.

Upon selecting a positioning group to join, the group formation circuitry 1744 may then generate a responder group formation message to be broadcast during the responder sub-phase of the current group phase. The responder group formation message may include, for example, device information associated with the non-anchor device 1700, the initiator ID of the initiator device for the selected positioning group, and respective responder IDs of responder devices that previously broadcast responder group formation messages 1716 to join the positioning group prior to generation of the responder group formation message by the group formation circuitry 1744. In addition, the group formation circuitry 1744 may receive the GAM 1718 including the order 1722 of responder devices from the initiator device of the positioning group. The group formation circuitry 1744 may further be configured to execute group formation instructions (software) 1754 stored in the computer-readable medium 1706 to implement one or more of the functions described herein.

The processor 1704 may further include PRS generation circuitry 1746 configured to generate a PRS to be broadcast to the positioning group during a PRS phase. For example, the PRS may include a PRS sequence. The PRS sequence may be a wideband random sequence that is broadcast over an unlicensed frequency band. In some examples, the PRS may include a sequence identifier (ID) identifying the PRS sequence. The PRS generation circuitry 1746 may further determine the transmission timing of the PRS based on the order 1722 of wireless communication devices in the positioning group. In examples in which the wireless communication device is the initiator device of the positioning group, the PRS generation circuitry 1746 may be configured to implement Cat 4 LBT to reserve the sidelink channel for a CoT and broadcast the first PRS to the positioning group within the CoT. In examples in which the wireless communication device is a responder device, the PRS generation circuitry 1746 may be configured to broadcast the PRS to the positioning group within the CoT at a transmission time determined from the order 1722 of responder devices. The PRS generation circuitry 1746 may further be configured to execute PRS generation instructions (software) 1756 stored in the computer-readable medium 1706 to implement one or more of the functions described herein.

FIG. 18 is a flow chart 1800 of an exemplary method for group-based PRS broadcast according to some aspects. As described below, some or all illustrated features may be omitted in a particular implementation within the scope of the present disclosure, and some illustrated features may not be required for implementation of all embodiments. In some examples, the method may be performed by the wireless communication device 1700, as described above and illustrated in FIG. 17, by a processor or processing system, or by any suitable means for carrying out the described functions.

At block 1802, the wireless communication device (e.g., a first wireless communication device) may transmit a first group formation broadcast message associated with a first positioning group comprising a first plurality of wireless communication devices including the first wireless communication device. In some examples, the first wireless communication device may transmit the first group formation braoadcast message within a group phase in a time domain. The group phase may include at least an initiator sub-phase within which initiator devices can broadcast respective group formation broadcast messages and a responder sub-phase within which responder devices can broadcast respective group formation broadcast messages. The initiator devices may include at least anchor devices, each having a respective known location based on a location accuracy. The responder devices include at least non-anchor devices, each having a respective unknown location based on the location accuracy.

At block 1804, the first wireless communication device may receive a second group formation broadcast message associated with a second positioning group comprising a second plurality of wireless communication devices including a second wireless communication device, the second positioning group being associated with a channel occupancy time (CoT) in a sidelink channel. The second plurality of wireless communication devices may be configured to communicate reference signals (e.g., PRSs) using transmission opportunities within the CoT.

At block 1806, the first wireless communication device may initiate transmission of reference signals by the first plurality of wireless communication devices using additional transmission opportunities within the CoT associated with the second positioning group. For example, the PRS generation circuitry 1746, together with the communication and processing circuitry 1742 and transceiver 1710, shown and described above in connection with FIG. 17 may provide a means to transmit reference signals.

In one configuration, the wireless communication device 1700 includes means for group-based PRS broadcast as described in the present disclosure. In one aspect, the aforementioned means may be the processor 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1-5, 10, and/or 17, and utilizing, for example, the processes and/or algorithms described herein in relation to FIG. 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5, 10 and/or 17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Implementation examples are described in the following numbered clauses:

Clause 1: A method for device location estimation comprising, at a first wireless communication device: transmitting a first group formation broadcast message associated with a first positioning group comprising a first plurality of wireless communication devices including the first wireless communication device; receiving a second group formation broadcast message associated with a second positioning group comprising a second plurality of wireless communication devices including a second wireless communication device, the second positioning group being associated with a channel occupancy time (CoT) in a sidelink channel, the CoT comprising transmission opportunities configured to be used by the second plurality of wireless communication devices for communicating reference signals; and initiating transmission of reference signals by the first plurality of wireless communication devices using additional transmission opportunities within the CoT associated with the second positioning group.

Clause 2: The method of clause 1, wherein the initiating the transmission of the reference signals by first plurality of wireless communication devices comprises: at the first wireless communication device, sending a first reference signal in an ordered sequence of reference signals to be sent from the first plurality of wireless communication devices, using a first one of the additional transmission opportunities within the CoT associated with the second positioning group.

Clause 3: The method of any of clauses 1-2 further comprising at the first wireless communication device, prior to sending the first reference signal, broadcasting a group association broadcast message specifying an order of transmission for the ordered sequence of reference signals to be sent from the first plurality of wireless communication devices.

Clause 4: The method of any of clauses 1-3 wherein the initiating the transmission of the reference signals by first plurality of wireless communication devices is performed in response to a sensor-based trigger.

Clause 5: The method of clause 4 wherein the sensor-based trigger is based on a frequency of received reference signals from the second plurality of wireless communication devices.

Clause 6: The method of clause 4 wherein the sensor-based trigger is based on one or more received power measurements associated with one or more reference signals received from the second plurality of wireless communication devices.

Clause 7: The method of any of clauses 1-3 wherein the initiating the transmission of the reference signals by first plurality of wireless communication devices is performed in response to a network-based trigger.

Clause 8: The method of any of clauses 1-7 further comprising coordinating with the second wireless communication device to establish sharing of the CoT between the first plurality of wireless communication devices and the second plurality of wireless communication device.

Clause 9: The method of clause 8 wherein a start time for the CoT is based on a back-off time selected from an interval based on (a) a count of a number of reference signals associated with the first plurality of wireless communication devices and (b) a count of a number of reference signals associated with the second plurality of wireless communication devices.

Clause 10: The method of any of clauses 1-9 further comprising independently establishing sharing of the CoT between the first plurality of wireless communication devices and the second plurality of wireless communication device, without coordinating with the second wireless communication device.

Clause 11: The method of clause 10 wherein a start time of the CoT is based on a back-off time selected from an interval based on a count of a number of reference signals associated with the second plurality of wireless communication devices.

Clause 12: The method of any of clauses 1-11 further comprising determining a first duration for transmission of reference signals by the first plurality of wireless communication device; determining a second duration for transmission of reference signals by the second plurality of wireless communication device; and confirming that the first duration of transmission of reference signals is less than the CoT minus the second duration of transmission of reference signals, prior to the initiating transmission of reference signals by the first plurality of wireless communication devices using the additional transmission opportunities within the CoT associated with the second positioning group.

Clause 13: The method of clause 12 further comprising performing a successful clear channel assessment (CCA), prior to the initiating transmission of reference signals by the first plurality of wireless communication devices using the additional transmission opportunities within the CoT associated with the second positioning group.

Clause 14: The method of any of clauses 1-13 wherein the reference signals support round trip time (RTT) measurements between (a) at least one wireless communication device in the first plurality of wireless communication devices and (b) at least one wireless communication device in the second plurality of wireless communication devices.

Clause 15: The method of any of clauses 1-14 further comprising communicating with the second wireless communication device using a separate channel.

Clause 16: The method of clause 15 wherein the separate channel is positioned within an Intelligent Transport Systems (ITS) frequency band.

Clause 17: The method of any of clauses 1-16 wherein the sidelink channel is positioned within an unlicensed spectrum.

Clause 18: A first wireless communication device in a wireless communication network, comprising: a wireless transceiver; a memory; and a processor communicatively coupled to the wireless transceiver and the memory, wherein the processor is configured to: transmit, using the wireless transceiver, a first group formation broadcast message associated with a first positioning group comprising a first plurality of wireless communication devices including the first wireless communication device; receive, using the wireless transceiver, a second group formation broadcast message associated with a second positioning group comprising a second plurality of wireless communication devices including a second wireless communication device, the second positioning group being associated with a channel occupancy time (CoT) in a sidelink channel, the CoT comprising transmission opportunities configured to be used by the second plurality of wireless communication devices for communicating reference signals; and initiate transmission of reference signals by the first plurality of wireless communication devices using additional transmission opportunities within the CoT associated with the second positioning group.

Clause 19: The first wireless communication device of clause 18, wherein the processor is configured to initiate the transmission of the reference signals by the first plurality of wireless communication devices by: at the first wireless communication device, sending a first reference signal in an ordered sequence of reference signals to be sent from the first plurality of wireless communication devices, using a first one of the additional transmission opportunities within the CoT associated with the second positioning group.

Clause 20: The first wireless communication device of clause 19 wherein the processor is further configured to: prior to sending the first reference signal, broadcast a group association broadcast message specifying an order of transmission for the ordered sequence of reference signals to be sent from the first plurality of wireless communication devices.

Clause 21: The first wireless communication device of any of clauses 18-20 wherein the processor is further configured to: initiate the transmission of the reference signals by the first plurality of wireless communication devices in response to a sensor-based trigger.

Clause 22: The first wireless communication device of clause 21 wherein the sensor-based trigger is based on a frequency of received reference signals from the second plurality of wireless communication devices.

Clause 23: The first wireless communication device of clause 21 wherein the sensor-based trigger is based on one or more received power measurements associated with one or more reference signals received from the second plurality of wireless communication devices.

Clause 24: The first wireless communication device of any of clauses 18-20 wherein the processor is further configured to: initiate the transmission of the reference signals by the first plurality of wireless communication devices in response to a network-based trigger.

Clause 25: The first wireless communication device of any of clauses 18-24 wherein the processor is further configured to: coordinate with the second wireless communication device to establish sharing of the CoT between the first plurality of wireless communication devices and the second plurality of wireless communication device.

Clause 26: The first wireless communication device of clause 25 wherein a start time for the CoT is based on a back-off time selected from an interval based on (a) a count of a number of reference signals associated with the first plurality of wireless communication devices and (b) a count of a number of reference signals associated with the second plurality of wireless communication devices.

Clause 27: The first wireless communication device of any of clauses 18-24 wherein the processor is further configured to: independently establish sharing of the CoT between the first plurality of wireless communication devices and the second plurality of wireless communication device, without coordinating with the second wireless communication device.

Clause 28: The first wireless communication device of clause 27 wherein a start time of the CoT is based on a back-off time selected from an interval based on a count of a number of reference signals associated with the second plurality of wireless communication devices.

Clause 29: The first wireless communication device of any of clauses 18-28 wherein the processor is further configured to: determine a first duration for transmission of reference signals by the first plurality of wireless communication device; determine a second duration for transmission of reference signals by the second plurality of wireless communication device; and confirm that the first duration of transmission of reference signals is less than the CoT minus the second duration of transmission of reference signals, prior to the initiating transmission of reference signals by the first plurality of wireless communication devices using the additional transmission opportunities within the CoT associated with the second positioning group.

Clause 30: The first wireless communication device of clause 29 wherein the processor is further configured to: perform a successful clear channel assessment (CCA), prior to the initiating transmission of reference signals by the first plurality of wireless communication devices using the additional transmission opportunities within the CoT associated with the second positioning group.

Clause 31: The first wireless communication device of any of clauses 18-30 wherein the reference signals support round trip time (RTT) measurements between (a) at least one wireless communication device in the first plurality of wireless communication devices and (b) at least one wireless communication device in the second plurality of wireless communication devices.

Clause 32: The first wireless communication device of any of clauses 18-31 wherein the processor is further configured to: communicate with the second wireless communication device using a separate channel.

Clause 33: The first wireless communication device of clause 32 wherein the separate channel is positioned within an Intelligent Transport Systems (ITS) frequency band.

Clause 34: The first wireless communication device of any of clauses 18-33 wherein the sidelink channel is positioned within an unlicensed spectrum.

Clause 35: A first wireless communication device in a wireless communication network, comprising: means for transmitting a first group formation broadcast message associated with a first positioning group comprising a first plurality of wireless communication devices including the first wireless communication device; means for receiving a second group formation broadcast message associated with a second positioning group comprising a second plurality of wireless communication devices including a second wireless communication device, the second positioning group being associated with a channel occupancy time (CoT) in a sidelink channel, the CoT comprising transmission opportunities configured to be used by the second plurality of wireless communication devices for communicating reference signals; and means for initiating transmission of reference signals by the first plurality of wireless communication devices using additional transmission opportunities within the CoT associated with the second positioning group.

Clause 36: A non-transitory computer-readable medium storing instructions therein for execution by one or more processing units, comprising instructions to: transmit a first group formation broadcast message associated with a first positioning group comprising a first plurality of wireless communication devices including the first wireless communication device; receive a second group formation broadcast message associated with a second positioning group comprising a second plurality of wireless communication devices including a second wireless communication device, the second positioning group being associated with a channel occupancy time (CoT) in a sidelink channel, the CoT comprising transmission opportunities configured to be used by the second plurality of wireless communication devices for communicating reference signals; and initiate transmission of reference signals by the first plurality of wireless communication devices using additional transmission opportunities within the CoT associated with the second positioning group.

What is claimed is:

1. A method for device location estimation comprising, at a first wireless communication device:

transmitting a first group formation broadcast message associated with a first positioning group comprising a first plurality of wireless communication devices including the first wireless communication device;

receiving a second group formation broadcast message associated with a second positioning group comprising a second plurality of wireless communication devices including a second wireless communication device, the second positioning group being associated with a channel occupancy time (CoT) in a sidelink channel, the CoT comprising transmission opportunities configured to be used by the second plurality of wireless communication devices for communicating reference signals;

initiating transmission of reference signals by the first plurality of wireless communication devices using additional transmission opportunities within the CoT associated with the second positioning group; and the method further comprising:

determining a first duration for transmission of reference signals by the first plurality of wireless communication device;

determining a second duration for transmission of reference signals by the second plurality of wireless communication device; and confirming that the first duration of transmission of reference signals is less than the CoT minus the second duration of transmission of reference signals, prior to the initiating transmission of reference signals by the first plurality of wireless communication devices using the additional transmission opportunities within the CoT associated with the second positioning group.

2. The method of claim 1, wherein the initiating transmission of the reference signals by first plurality of wireless communication devices comprises:

at the first wireless communication device, sending a first reference signal in an ordered sequence of reference signals to be sent from the first plurality of wireless communication devices, using a first one of the additional transmission opportunities within the CoT associated with the second positioning group.

3. The method of claim 2, further comprising:

at the first wireless communication device, prior to sending the first reference signal, broadcasting a group association broadcast message specifying an order of transmission for the ordered sequence of reference signals to be sent from the first plurality of wireless communication devices.

4. The method of claim 1, wherein the initiating the transmission of the reference signals by first plurality of wireless communication devices is performed in response to a sensor-based trigger.

5. The method of claim 4, wherein the sensor-based trigger is based on a frequency of received reference signals from the second plurality of wireless communication devices.

6. The method of claim 4, wherein the sensor-based trigger is based on one or more received power measurements associated with one or more reference signals received from the second plurality of wireless communication devices.

7. The method of claim 1, wherein the initiating the transmission of the reference signals by first plurality of wireless communication devices is performed in response to a network-based trigger.

8. The method of claim 1, further comprising:

coordinating with the second wireless communication device to establish sharing of the CoT between the first plurality of wireless communication devices and the second plurality of wireless communication device.

9. The method of claim 8, wherein a start time for the CoT is based on a back-off time selected from an interval based on (a) a count of a number of reference signals associated with the first plurality of wireless communication devices and (b) a count of a number of reference signals associated with the second plurality of wireless communication devices.

10. The method of claim 1, further comprising:

independently establishing sharing of the CoT between the first plurality of wireless communication devices and the second plurality of wireless communication device, without coordinating with the second wireless communication device.

11. The method of claim 10, wherein a start time of the CoT is based on a back-off time selected from an interval based on a count of a number of reference signals associated with the second plurality of wireless communication devices.

12. The method of claim 1, further comprising:

performing a successful clear channel assessment (CCA), prior to the initiating transmission of reference signals by the first plurality of wireless communication devices using the additional transmission opportunities within the CoT associated with the second positioning group.

13. The method of claim 1, wherein the reference signals support round trip time (RTT) measurements between (a) at least one wireless communication device in the first plurality of wireless communication devices and (b) at least one wireless communication device in the second plurality of wireless communication devices.

14. The method of claim 1, further comprising:

communicating with the second wireless communication device using a separate channel.

15. The method of claim 14, wherein the separate channel is positioned within an Intelligent Transport Systems (ITS) frequency band.

16. The method of claim 1, wherein the sidelink channel is positioned within an unlicensed spectrum.

17. A first wireless communication device in a wireless communication network, comprising:

a wireless transceiver;

a memory; and a processor communicatively coupled to the wireless transceiver and the memory, wherein the processor is configured to:

transmit, using the wireless transceiver, a first group formation broadcast message associated with a first positioning group comprising a first plurality of wireless communication devices including the first wireless communication device;

receive, using the wireless transceiver, a second group formation broadcast message associated with a second positioning group comprising a second plurality of wireless communication devices including a second wireless communication device, the second positioning group being associated with a channel occupancy time (CoT) in a sidelink channel, the CoT comprising transmission opportunities configured to be used by the second plurality of wireless communication devices for communicating reference signals;

initiate transmission of reference signals by the first plurality of wireless communication devices using additional transmission opportunities within the CoT associated with the second positioning group; wherein the processor is further configured to:

determine a first duration for transmission of reference signals by the first plurality of wireless communication device;

determine a second duration for transmission of reference signals by the second plurality of wireless communication device; and confirm that the first duration of transmission of reference signals is less than the CoT minus the second duration of transmission of reference signals, prior to the initiating transmission of reference signals by the first plurality of wireless communication devices using the additional transmission opportunities within the CoT associated with the second positioning group.

18. The first wireless communication device of claim 17, wherein the processor is configured to initiate the transmission of the reference signals by the first plurality of wireless communication devices by:

at the first wireless communication device, sending a first reference signal in an ordered sequence of reference signals to be sent from the first plurality of wireless communication devices, using a first one of the additional transmission opportunities within the CoT associated with the second positioning group.

19. The first wireless communication device of claim 18, wherein the processor is further configured to:

prior to sending the first reference signal, broadcast a group association broadcast message specifying an order of transmission for the ordered sequence of reference signals to be sent from the first plurality of wireless communication devices.

20. The first wireless communication device of claim 17, wherein the processor is further configured to:

initiate the transmission of the reference signals by the first plurality of wireless communication devices in response to a sensor-based trigger.

21. The first wireless communication device of claim 20, wherein the sensor-based trigger is based on a frequency of received reference signals from the second plurality of wireless communication devices.

22. The first wireless communication device of claim 20, wherein the sensor-based trigger is based on one or more received power measurements associated with one or more reference signals received from the second plurality of wireless communication devices.

23. The first wireless communication device of claim 17, wherein the processor is further configured to:

initiate the transmission of the reference signals by the first plurality of wireless communication devices in response to a network-based trigger.

24. The first wireless communication device of claim 17, wherein the processor is further configured to:

coordinate with the second wireless communication device to establish sharing of the CoT between the first plurality of wireless communication devices and the second plurality of wireless communication device.

25. The first wireless communication device of claim 24, wherein a start time for the CoT is based on a back-off time selected from an interval based on (a) a count of a number of reference signals associated with the first plurality of wireless communication devices and (b) a count of a number of reference signals associated with the second plurality of wireless communication devices.

26. The first wireless communication device of claim 17, wherein the processor is further configured to:

independently establish sharing of the CoT between the first plurality of wireless communication devices and the second plurality of wireless communication device, without coordinating with the second wireless communication device.

27. The first wireless communication device of claim 26, wherein a start time of the CoT is based on a back-off time selected from an interval based on a count of a number of reference signals associated with the second plurality of wireless communication devices.

28. The first wireless communication device of claim 18, wherein the processor is further configured to:

perform a successful clear channel assessment (CCA), prior to the initiating transmission of reference signals by the first plurality of wireless communication devices using the additional transmission opportunities within the CoT associated with the second positioning group.

29. The first wireless communication device of claim 17, wherein the reference signals support round trip time (RTT) measurements between (a) at least one wireless communication device in the first plurality of wireless communication devices and (b) at least one wireless communication device in the second plurality of wireless communication devices.

30. The first wireless communication device of claim 17, wherein the processor is further configured to:

communicate with the second wireless communication device using a separate channel.

31. The first wireless communication device of claim 30, wherein the separate channel is positioned within an Intelligent Transport Systems (ITS) frequency band.

32. The first wireless communication device of claim 17, wherein the sidelink channel is positioned within an unlicensed spectrum.

33. A first wireless communication device in a wireless communication network, comprising:

means for transmitting a first group formation broadcast message associated with a first positioning group comprising a first plurality of wireless communication devices including the first wireless communication device;

means for receiving a second group formation broadcast message associated with a second positioning group comprising a second plurality of wireless communication devices including a second wireless communication device, the second positioning group being associated with a channel occupancy time (CoT) in a sidelink channel, the CoT comprising transmission opportunities configured to be used by the second plurality of wireless communication devices for communicating reference signals;

means for initiating transmission of reference signals by the first plurality of wireless communication devices using additional transmission opportunities within the CoT associated with the second positioning group; wherein the first wireless communication device further comprising:

means for determining a first duration for transmission of reference signals by the first plurality of wireless communication device;

means for determining a second duration for transmission of reference signals by the second plurality of wireless communication device; and means for confirming that the first duration of transmission of reference signals is less than the CoT minus the second duration of transmission of reference signals, prior to the initiating transmission of reference signals by the first plurality of wireless communication devices using the additional transmission opportunities within the CoT associated with the second positioning group.

34. A non-transitory computer-readable medium storing instructions therein for execution by one or more processing units, comprising instructions to:

transmit a first group formation broadcast message associated with a first positioning group comprising a first plurality of wireless communication devices including the first wireless communication device;

receive a second group formation broadcast message associated with a second positioning group comprising a second plurality of wireless communication devices including a second wireless communication device, the second positioning group being associated with a channel occupancy time (CoT) in a sidelink channel, the CoT comprising transmission opportunities configured to be used by the second plurality of wireless communication devices for communicating reference signals; and initiate transmission of reference signals by the first plurality of wireless communication devices using additional transmission opportunities within the CoT associated with the second positioning group; wherein the instructions further comprising instructions to:

determine a first duration for transmission of reference signals by the first plurality of wireless communication device;

determine a second duration for transmission of reference signals by the second plurality of wireless communication device; and confirm that the first duration of transmission of reference signals is less than the CoT minus the second duration of transmission of reference signals, prior to the initiating transmission of reference signals by the first plurality of wireless communication devices using the additional transmission opportunities within the CoT associated with the second positioning group.

* * * * *